United States Patent
Bridges et al.

(10) Patent No.: US 10,563,969 B2
(45) Date of Patent: *Feb. 18, 2020

(54) APPARATUS AND METHOD TO COMPENSATE BEARING RUNOUT IN AN ARTICULATED ARM COORDINATE MEASUREMENT MACHINE

(71) Applicant: FARO Technologies, Inc., Lake Mary, FL (US)

(72) Inventors: Robert E. Bridges, Kennett Square, PA (US); Raymond Sullivan, Altamonte Springs, FL (US); Eric J. Moy, Orlando, FL (US); Michael J. Hale, Orlando, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 289 days.

This patent is subject to a terminal disclaimer.

(21) Appl. No.: 15/641,589

(22) Filed: Jul. 5, 2017

(65) Prior Publication Data
US 2017/0299365 A1    Oct. 19, 2017

Related U.S. Application Data

(63) Continuation of application No. 14/823,261, filed on Aug. 11, 2015, now Pat. No. 9,746,304, and a
(Continued)

(51) Int. Cl.
*G01B 5/008*    (2006.01)
*G01B 21/04*    (2006.01)
(Continued)

(52) U.S. Cl.
CPC .............. *G01B 5/008* (2013.01); *G01B 11/005* (2013.01); *G01B 11/24* (2013.01); *G01B 21/042* (2013.01); *G01B 21/045* (2013.01); *G01M 13/04* (2013.01)

(58) Field of Classification Search
CPC ....................................................... G01B 5/008
(Continued)

(56) References Cited

U.S. PATENT DOCUMENTS

| 4,676,002 A | 6/1987 | Slocum |
| 5,193,401 A | 3/1993 | Bridges |

(Continued)

FOREIGN PATENT DOCUMENTS

| CN | 1846148 A | 10/2006 |
| CN | 101384881 A | 3/2009 |

(Continued)

OTHER PUBLICATIONS

E.R. Marsh "Precision Spindle Metrology" (109 pages) ASPE Annuyal Meeting.
(Continued)

*Primary Examiner* — George B Bennett
(74) *Attorney, Agent, or Firm* — Cantor Colburn LLP

(57) ABSTRACT

A method and apparatus for correcting errors in a bearing cartridge used in a portable articulated arm coordinate measurement machine (AACMM) is provided. The method includes providing a cartridge having a first bearing and a second bearing arranged in a fixed relationship to define an axis, the cartridge further including an angle measurement device configured to measure a rotation of a portion of the cartridge about the axis. A plurality of angles is measured with the angle measurement device. A first plurality of displacements is determined at a first position along the axis, each of the first plurality of displacements being associated with one of the plurality of angles. Compensation values are determined based at least in part on the plurality of angles and the first plurality of displacements.

19 Claims, 28 Drawing Sheets

Related U.S. Application Data continuation-in-part of application No. 14/729,151, filed on Jun. 3, 2015, now Pat. No. 9,423,282, and a continuation-in-part of application No. 14/726,873, filed on Jun. 1, 2015, now Pat. No. 9,482,525, said application No. 14/823,261 is a continuation-in-part of application No. 14/610,052, filed on Jan. 30, 2015, now Pat. No. 9,488,476, application No. 14/726,873, which is a continuation-in-part of application No. 13/888,442, filed on May 7, 2013, now Pat. No. 9,075,025.

(60) Provisional application No. 62/011,288, filed on Jun. 12, 2014, provisional application No. 61/936,416, filed on Feb. 6, 2014, provisional application No. 61/647,697, filed on May 16, 2012.

(51) Int. Cl.
  *G01M 13/04* (2019.01)
  *G01B 11/00* (2006.01)
  *G01B 11/24* (2006.01)

(58) Field of Classification Search
  USPC .......................................................... 33/503
  See application file for complete search history.

(56) References Cited

U.S. PATENT DOCUMENTS

| | | | |
|---|---|---|---|
| 5,611,147 | A | 3/1997 | Raab |
| 6,138,367 | A | 10/2000 | Raby |
| 6,243,658 | B1 | 6/2001 | Raby |
| 6,957,496 | B2 | 10/2005 | Raab et al. |
| 6,973,734 | B2 | 12/2005 | Raab et al. |
| 7,073,271 | B2 | 7/2006 | Raab et al. |
| 7,296,363 | B2 | 11/2007 | Danisch et al. |
| 7,327,446 | B2 | 2/2008 | Cramer et al. |
| 7,395,606 | B2 | 7/2008 | Crampton |
| 7,591,078 | B2 | 9/2009 | Crampton |
| 7,701,559 | B2 | 4/2010 | Bridges et al. |
| 7,800,758 | B1 | 9/2010 | Bridges et al. |
| RE42,082 | E | 2/2011 | Raab et al. |
| 7,954,250 | B2 | 6/2011 | Crampton |
| 8,763,267 | B2 | 7/2014 | Duportal et al. |
| 8,997,362 | B2 * | 4/2015 | Briggs ................. G01B 11/005 33/503 |
| 9,046,362 | B2 | 6/2015 | Westermark et al. |
| 9,075,025 | B2 | 7/2015 | Bridges |
| 9,423,282 | B2 | 8/2016 | Moy |
| 9,482,525 | B2 | 11/2016 | Bridges |
| 9,488,476 | B2 | 11/2016 | Bridges |
| 9,746,304 | B2 * | 8/2017 | Bridges ................. G01B 11/24 |
| 2005/0095877 | A1 | 5/2005 | Granger |
| 2005/0212513 | A1 | 9/2005 | Yamashita et al. |
| 2005/0225769 | A1 | 10/2005 | Bankhead et al. |
| 2009/0000136 | A1 | 1/2009 | Crampton |
| 2009/0171610 | A1 | 7/2009 | Haijima et al. |
| 2009/0187373 | A1 | 7/2009 | Atwell et al. |
| 2010/0128259 | A1 | 5/2010 | Bridges et al. |
| 2010/0269362 | A1 * | 10/2010 | Bos ..................... G01B 5/0002 33/503 |
| 2011/0007305 | A1 | 1/2011 | Bidges et al. |
| 2011/0282612 | A1 | 11/2011 | Cramer |
| 2012/0206716 | A1 | 8/2012 | Cramer et al. |
| 2012/0222465 | A1 | 9/2012 | Lippuner et al. |
| 2012/0326709 | A1 | 12/2012 | Westermark et al. |
| 2013/0097882 | A1 | 4/2013 | Bridges et al. |
| 2013/0125408 | A1 | 5/2013 | Atwell et al. |
| 2013/0187022 | A1 | 7/2013 | Duportal |
| 2013/0308117 | A1 | 11/2013 | Bridges |
| 2014/0101953 | A1 | 4/2014 | Briggs et al. |
| 2014/0202016 | A1 | 7/2014 | Bridges et al. |
| 2014/0260627 | A1 | 9/2014 | Ferrari et al. |
| 2015/0075018 | A1 | 3/2015 | Bridges et al. |
| 2015/0219452 | A1 | 8/2015 | Bridges et al. |
| 2015/0260506 | A1 | 9/2015 | Bridges |
| 2015/0330761 | A1 | 11/2015 | Gong |
| 2015/0330762 | A1 | 11/2015 | Gong |
| 2015/0330763 | A1 | 11/2015 | Gong |
| 2015/0330764 | A1 | 11/2015 | Gong |
| 2015/0330765 | A1 | 11/2015 | Gong |
| 2015/0330766 | A1 | 11/2015 | Gong |
| 2015/0362305 | A1 | 12/2015 | Ferrari et al. |
| 2015/0362348 | A1 | 12/2015 | Moy |
| 2018/0003662 | A1 * | 1/2018 | Fuchs .................. G01B 21/047 |
| 2018/0283840 | A1 * | 10/2018 | Tobiason ............... G01B 5/008 |
| 2019/0176863 | A1 * | 6/2019 | Sakuma .................. B62B 1/008 |

FOREIGN PATENT DOCUMENTS

| | | |
|---|---|---|
| EP | 1750085 | 2/2007 |
| EP | 2259010 A1 | 12/2010 |
| EP | 2607843 A1 | 6/2013 |
| JP | S64414 A | 1/1989 |
| JP | H1038615 A | 2/1998 |
| JP | 2007504459 A | 9/2003 |
| JP | 200629937 A | 2/2006 |
| JP | 2007521480 A | 8/2007 |
| JP | 2008527356 A | 7/2008 |
| JP | 201096708 A | 8/2008 |
| JP | 2009156773 A | 7/2009 |
| JP | 2009526209 A | 7/2009 |
| JP | 2012509464 A | 4/2012 |
| WO | 2005026772 A2 | 3/2005 |
| WO | 2010057169 A2 | 5/2010 |
| WO | 2012061122 | 5/2012 |
| WO | 2013092319 A1 | 6/2013 |

OTHER PUBLICATIONS

Geckeler, D. Ralf; Calibration of Angle Encoders Using Transfer Functions; Measurement Science and Technology; vol. 17 (2006) 2811-2818 pages.

Marsh et al "Precision Spindle Metrology: Test Instrumentation" Chapter 3-5 cover and front page (pp. 39-128) Jan. 1, 2010, Destech Publications, US; ISN: 978-1-61344-582-2; retrieved from the internet URL:http://www.knovel.com/web/portal/browse/disp.

Miller, Scott W., et al; Angular Runout Test Setup for High-Precision Ball Bearings; Proceedings of the 41st Aerospace Mechanisms Symposium, Jet Propulsion Laboratory; May 16-18, 2012; pp. 439-450.

Muralikrishnan, et al., "ASME B89.4.19 Performance Evaluation Tests and Geometric Misalignments in Laser Trackers," J. Res. Natl. Inst. Stand. Technol. 114, 21-35 (2009).

Notification of Transmittal of the International Search Report and the Written Opinion of the International Searching Authority, of the Declaration for PCT/US2015/014205 dated Apr. 8, 2015; dated Apr. 28, 2015; 1-11 pages.

* cited by examiner

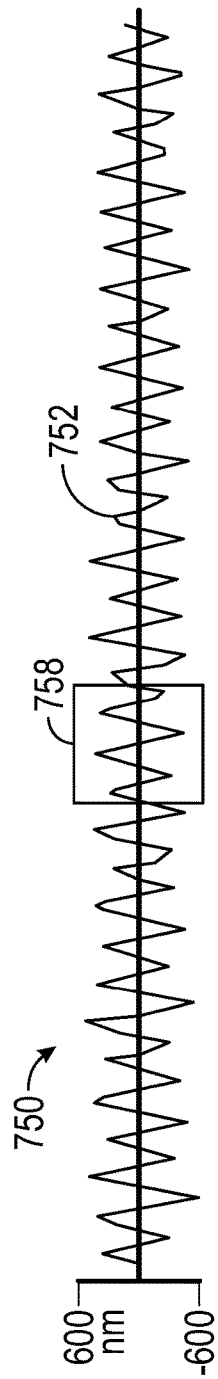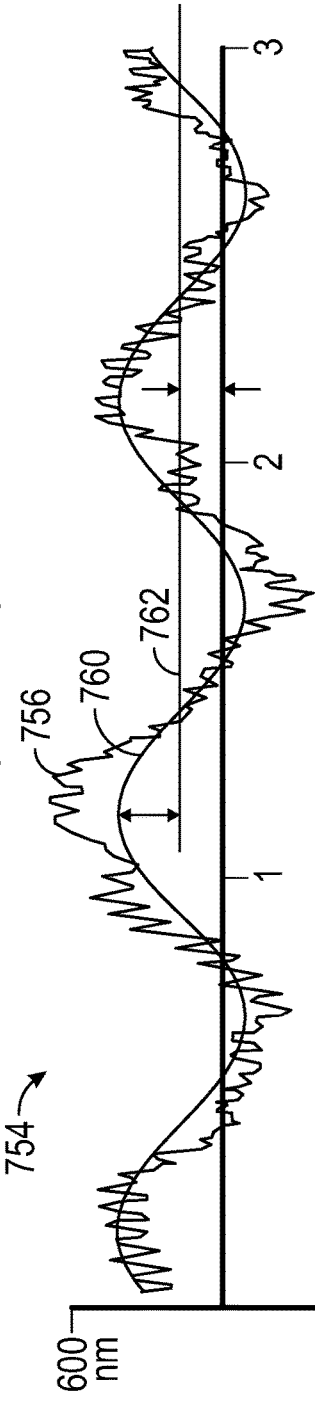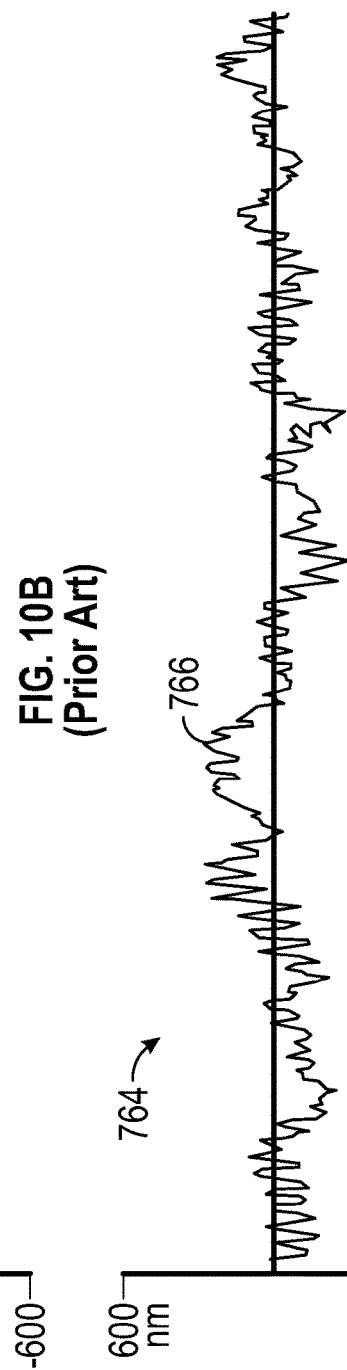
FIG. 10A (Prior Art)
FIG. 10B (Prior Art)
FIG. 10C (Prior Art)

APPARATUS AND METHOD TO COMPENSATE BEARING RUNOUT IN AN ARTICULATED ARM COORDINATE MEASUREMENT MACHINE

CROSS-REFERENCE TO RELATED APPLICATIONS

The present application is a continuation of U.S. application Ser. No. 14/823,261 filed on Aug. 11, 2015. U.S. application Ser. No. 14/823,261 is a continuation-in-part of U.S. application Ser. No. 14/610,052 filed on Jan. 30, 2015, which was nonprovisional application of U.S. Provisional Application Ser. No. 61/936,416 filed on Feb. 6, 2014. The present application is further a continuation-in-part of U.S. application Ser. No. 14/726,873 filed on Jun. 1, 2015, which is a continuation-in-part of U.S. application Ser. No. 13/888,442 filed on May 7, 2013, now U.S. Pat. No. 9,075,025. U.S. Pat. No. 9,075,025 is a nonprovisional application of U.S. Provisional Application Ser. No. 61/647,697 filed on May 16, 2012. The present application is also a continuation-in-part of U.S. application Ser. No. 14/729,151 filed on Jun. 3, 2015, which is a nonprovisional application of U.S. Application Ser. No. 62/011,288 filed on Jun. 12, 2014. The contents of all of the above are incorporated by reference herein in their entirety.

BACKGROUND

The present disclosure relates to a coordinate measuring machine, and more particularly to an apparatus and method of determining the bearing runout in cartridges of portable articulated arm coordinate measurement machines.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Relative rotational movement between the arm segments of the articulated arm CMM typically involves cartridges having a pair of bearings and an angular encoder. Current calibration methods account for mechanical errors such as non-squareness and axis offset. However other errors, such as bearing runout, may cause deviations in the measurements performed by the articulated arm CMM.

Accordingly, while existing methods of manufacturing articulated arm CMM's are suitable for their intended purposes the need for improvement remains, particularly in providing a method and apparatus for measuring bearing runout so compensation parameters may be determined.

BRIEF DESCRIPTION

In accordance with an embodiment, a method of correcting errors in a bearing cartridge used in a portable articulated arm coordinate measurement machine (AACMM) is provided. The method comprising providing the cartridge having a first bearing and a second bearing arranged in a fixed relationship to define an axis, the cartridge further including an angle measurement device configured to measure an angle of rotation of a portion of the cartridge about the axis, the angle measurement device being further configured to transmit an angle measurement signal in response to the rotation of the portion of the cartridge about the axis; rotating the portion of the cartridge about the axis by a plurality of turns in a forward direction and in a reverse direction, each turn being 360 degrees; measuring for each of the plurality of turns a plurality of first rotational values, each of the plurality of first rotational values comprising a first number of turns of the plurality of turns that the portion of the cartridge is rotated in the forward direction minus a second number of turns of the plurality of turns the portion of the cartridge is rotated in the reverse direction; measuring over the plurality of turns a plurality of angles with the angle measurement device; determining a first plurality of displacements at a first position along the axis, each of the first plurality of displacements being associated with one of the plurality of angles and one of the plurality of first rotational values; determining compensation values based at least in part on the measured plurality of angles, the plurality of first rotational values, and the determined first plurality of displacements; storing the compensation values in a memory; providing the AACMM with the cartridge installed between two arm segments and a rotational counter configured to measure a second rotational value of the installed cartridge, the second rotational value being a third number of turns the portion of the cartridge is rotated in the forward direction minus a fourth number of turns the portion of the cartridge is rotated in the reverse direction, wherein the rotational counter is further configured to measure the second rotational value when the AACMM is in a powered off-state and in a powered on-state; measuring a three-dimensional coordinate of an object with the AACMM based at least in part on the angular measurement signal, the stored compensation values, and second rotational value.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 10A-C are plots of data obtained from a measurement of bearing errors in a lathe spindle;

The detailed description explains embodiments of the invention, together with advantages and features, by way of example with reference to the drawings.

DETAILED DESCRIPTION

An embodiment of the present invention provides an enhanced AACMM that compensates for bearing cartridge errors, such as bearing runout and tilt/wobble. The compensation values measured for the bearing cartridges provides advantages in enhancing accuracy of the coordinate points measured by the AACMM. Embodiments of the invention provide advantages in a compensation system and method for measuring, recording and storing compensation values for each bearing cartridge to accommodate synchronous and asynchronous errors, such as bearing runout or tilt/wobble.

Figure 1A:
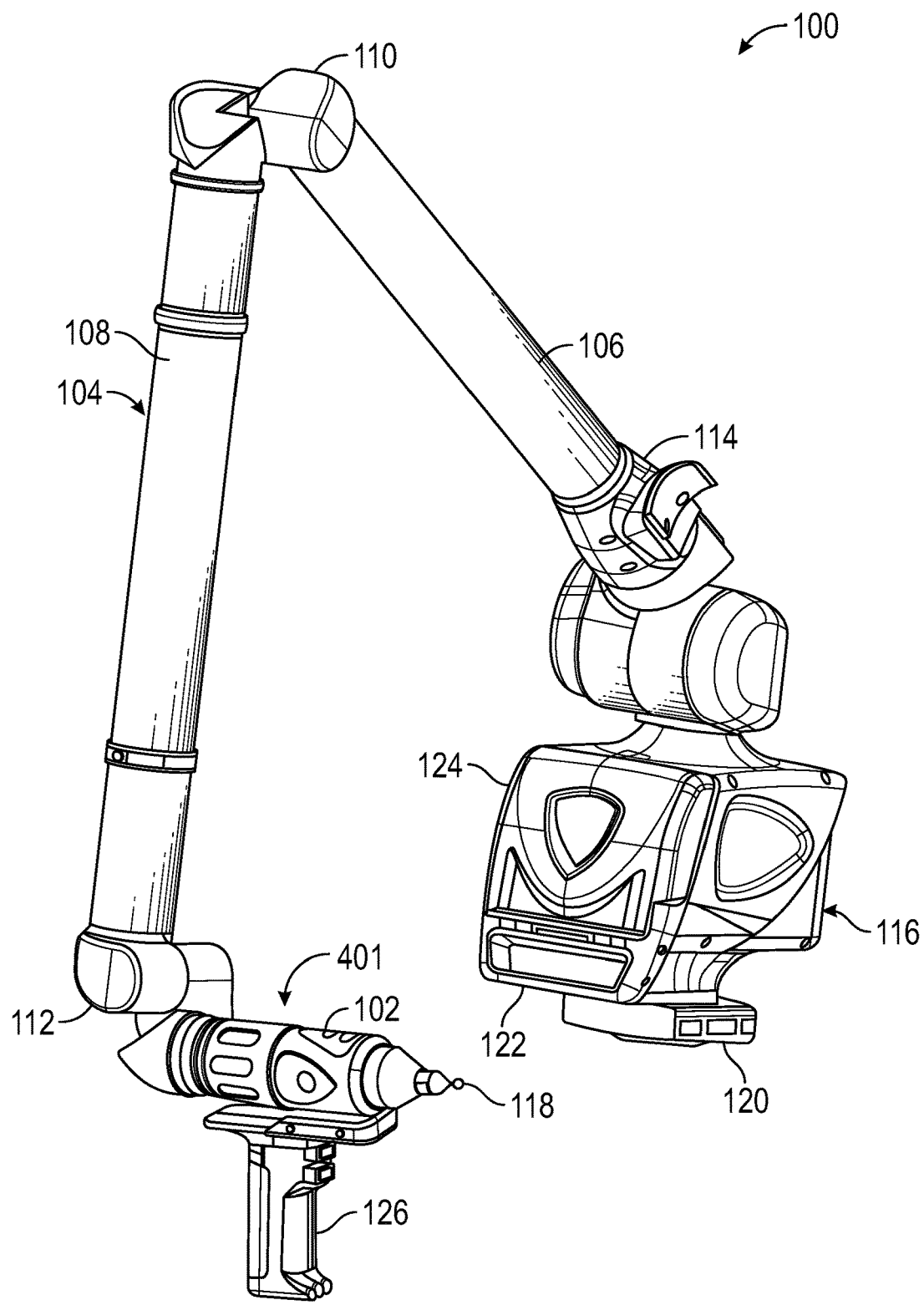
FIGS. 1A and 1B are perspective views of a portable articulated arm coordinate measuring machine (AACMM) having embodiments of various aspects of the present invention therewithin.
Figure 1B:
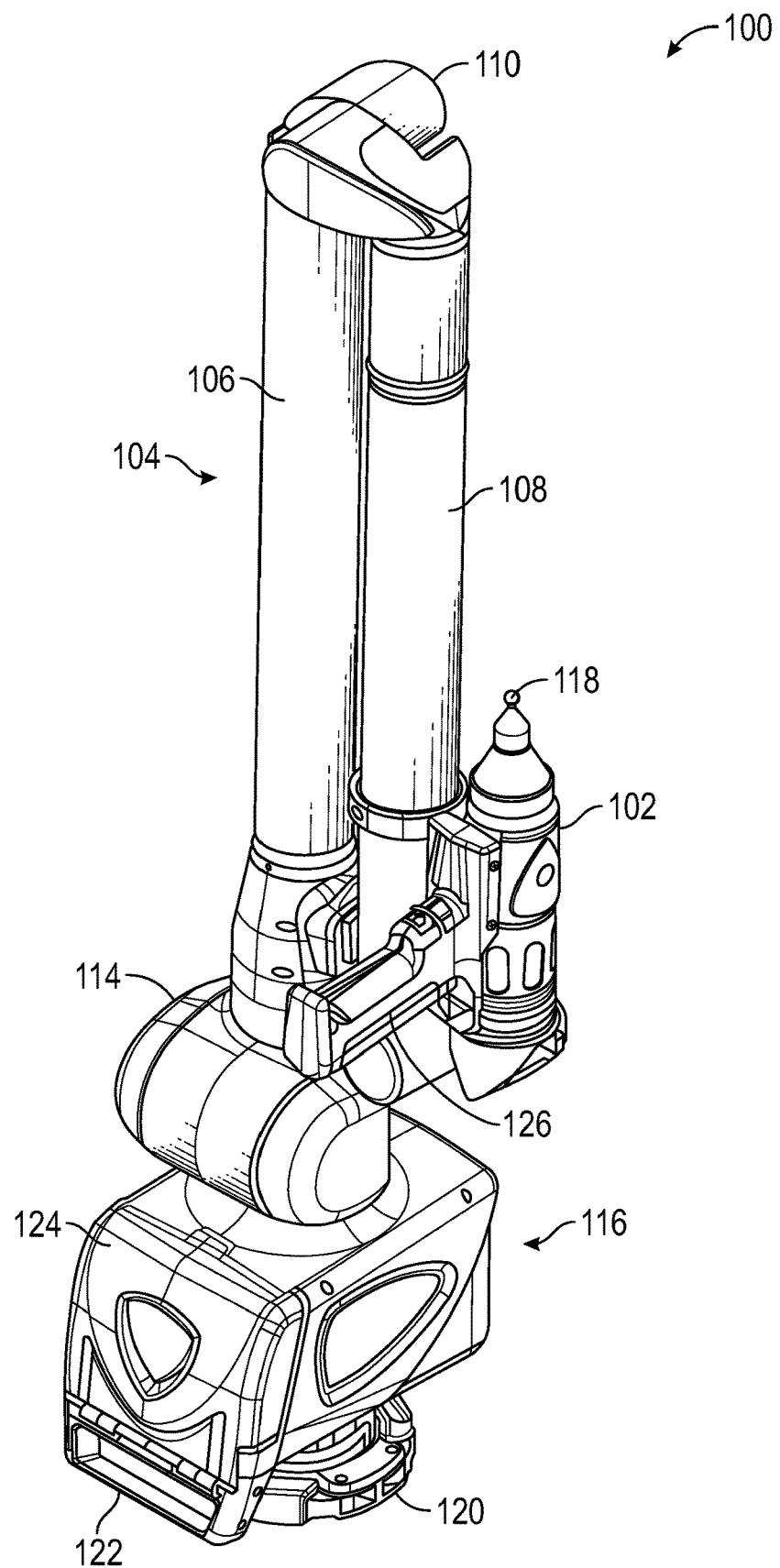

FIGS. 1A and 1B illustrate, in perspective, an AACMM 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a rotational connection having a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a contact probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

As will be discussed in more detail below, each of the groupings of bearing cartridges 110, 112, 114 may include one or more slip rings 221A-221D. The slip ring 221A-221D allows for the transfer of electrical along the length of the arm portion 104 while still allowing each of the groupings of bearing cartridges 110, 112, 114 to rotate substantially unencumbered.

The probe 118 is detachably mounted to the measurement probe housing 102, which is connected to bearing cartridge grouping 112. A handle accessory 126 is removable with respect to the measurement probe housing 102 by way of, for example, a quick-connect interface. In the exemplary embodiment, the quick-connect interface may include both mechanical fastening members that secure the accessory to the housing 102 and electrical connections that allow the user to control the probe 118 through the accessory (e.g. actuation buttons) and also provide for high speed data communication between the accessory and the base 116. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of accessory devices may replace the removable handle 126 to provide additional functionality. Examples of such accessory devices include, but are not limited to, one or more illumination lights, a temperature sensor, a thermal scanner, a bar code scanner, a projector, a paint sprayer, a camera, a video camera, an audio recording system or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include one or more electrical connectors that allow electrical power and data to be exchanged with the handle 126 and the corresponding electronics located in the probe end 401 and the base 116.

In various embodiments, and as will be discussed in more detail below, each rotational connection includes a grouping of bearing cartridges 110, 112, 114 that allow the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to or within the removable handle 126 on the AACMM 100). The electronics that support these peripheral hardware devices or features may be located in each of the bearing cartridge groupings 110, 112, 114 located within the portable AACMM 100.

Figure 2:
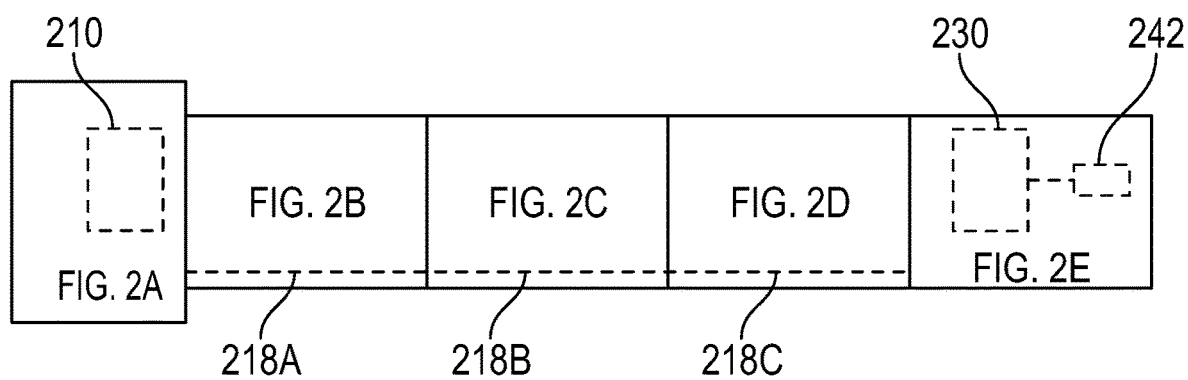
FIG. 2, including FIGS. 2A-2E taken together, is a block diagram of electronics utilized as part of the AACMM of FIG. 1 in accordance with an embodiment.
Figure 2A:
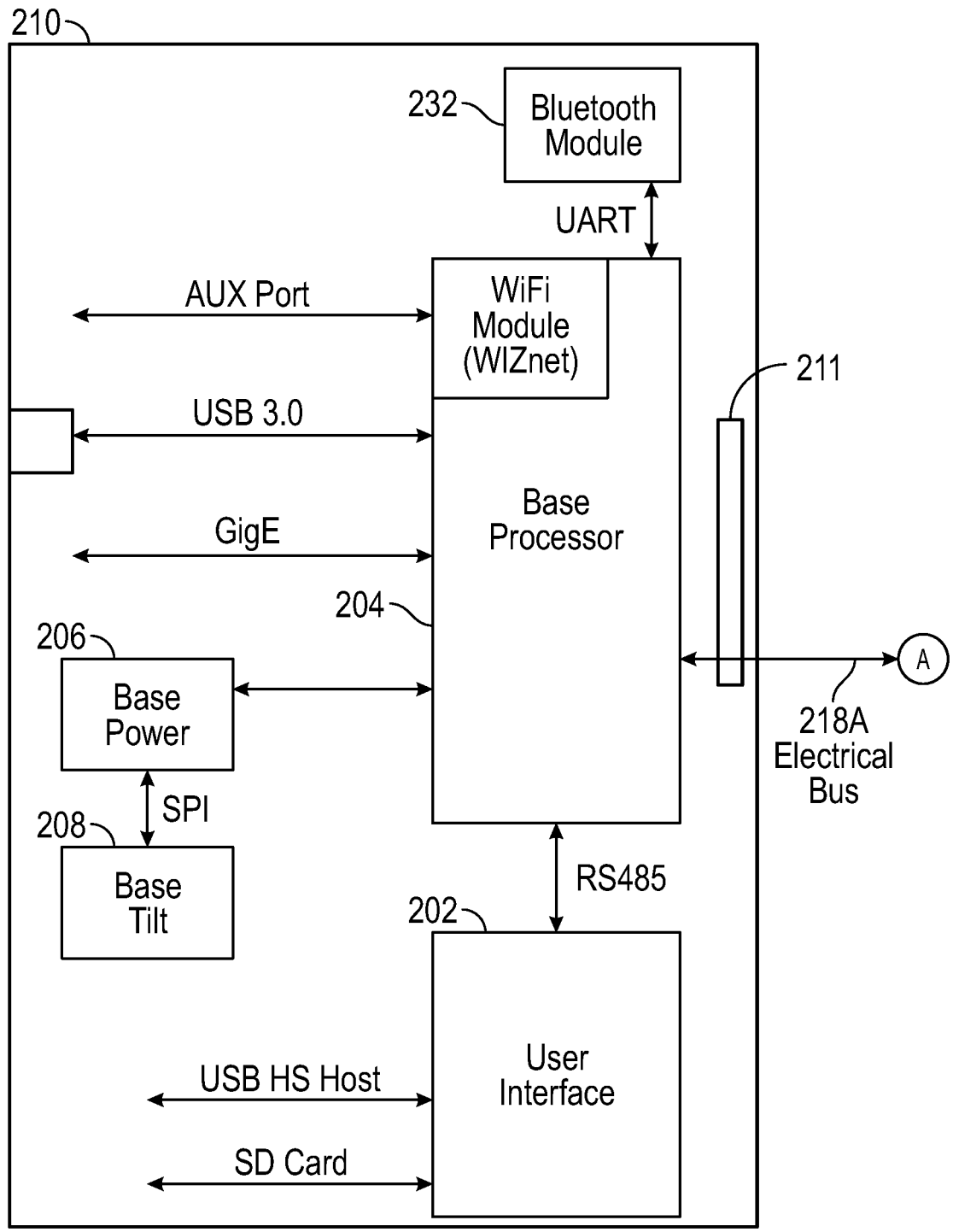
Figure 2B:
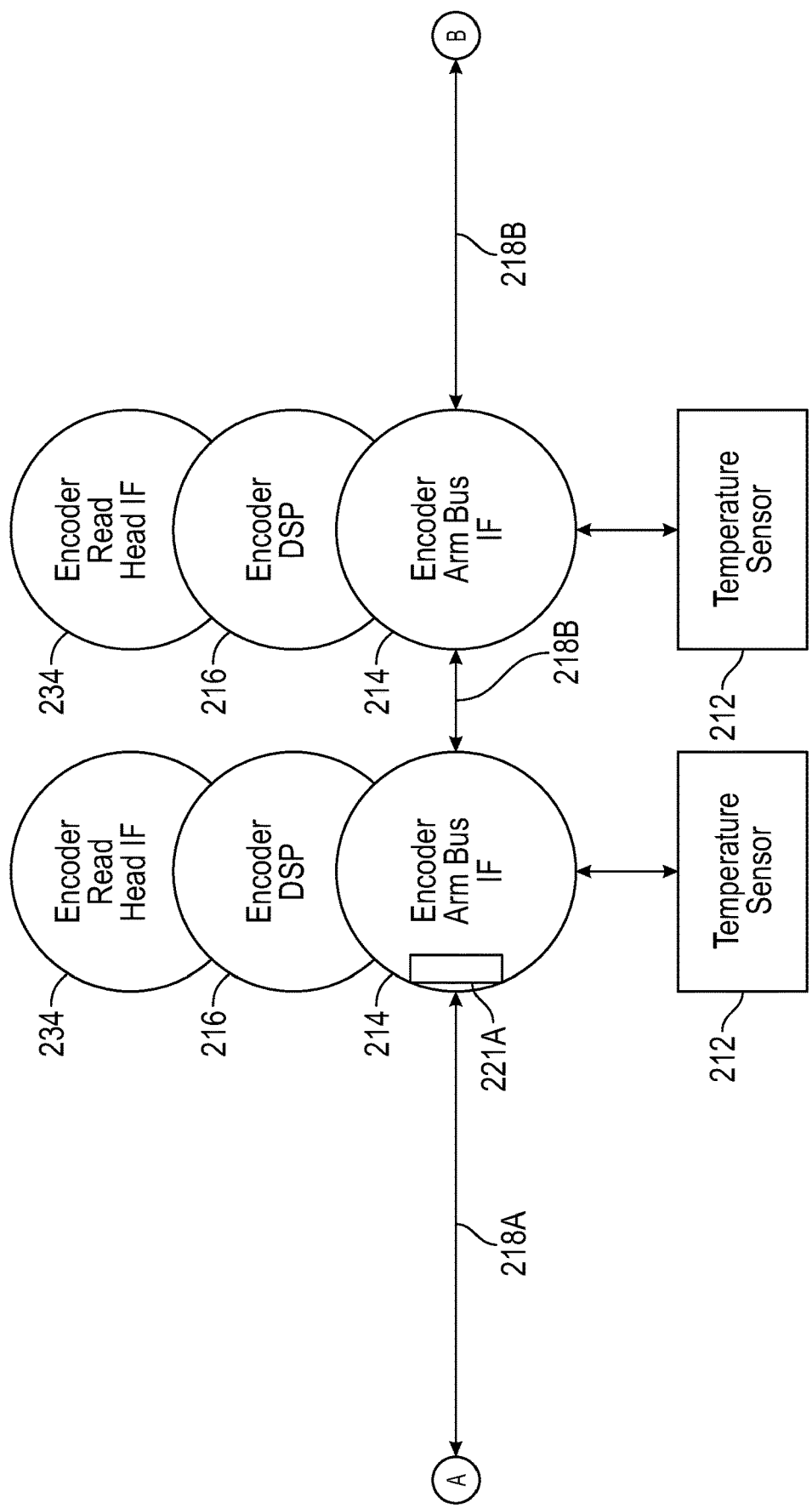
Figure 2C:
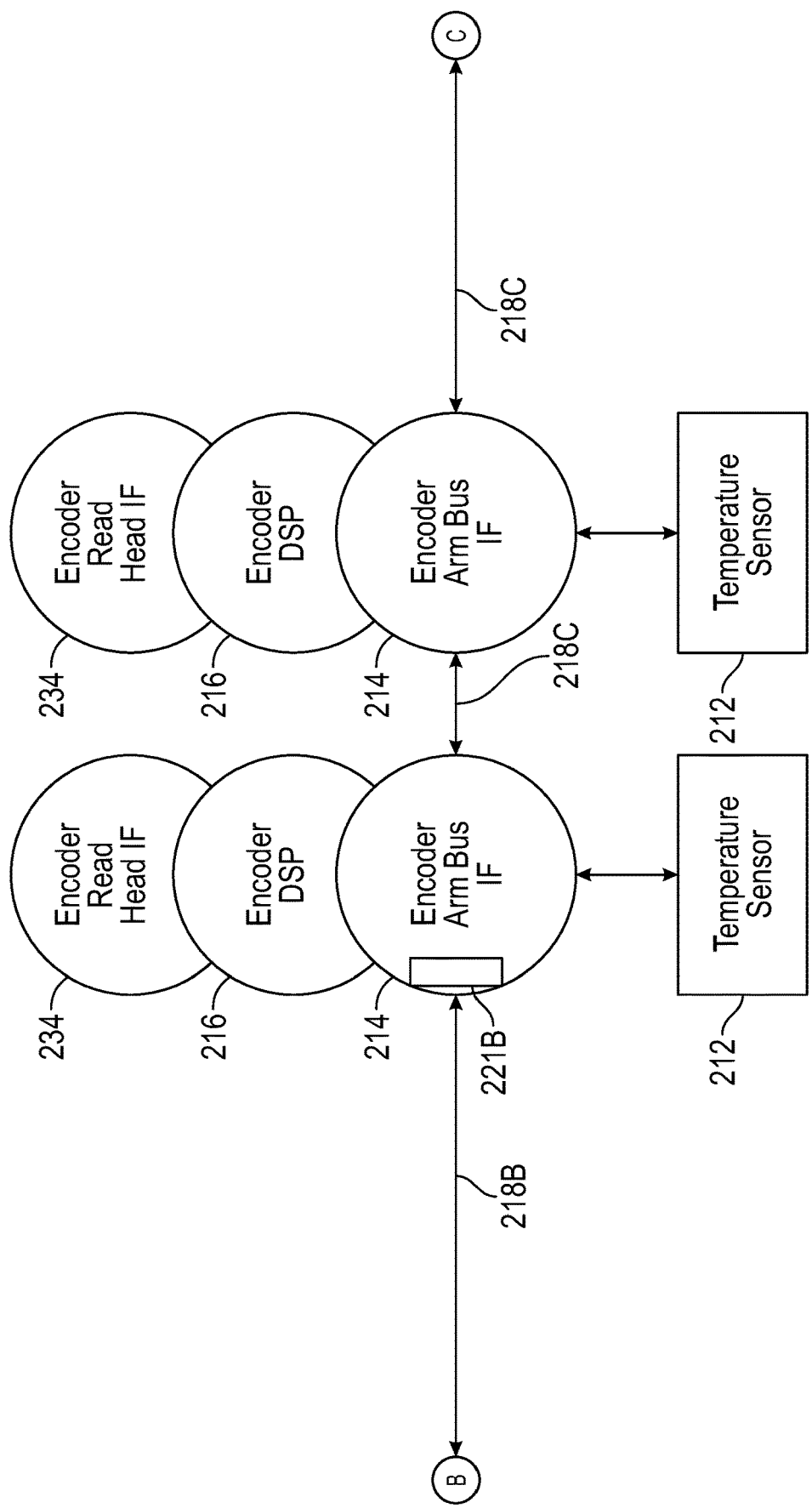
Figure 2D:
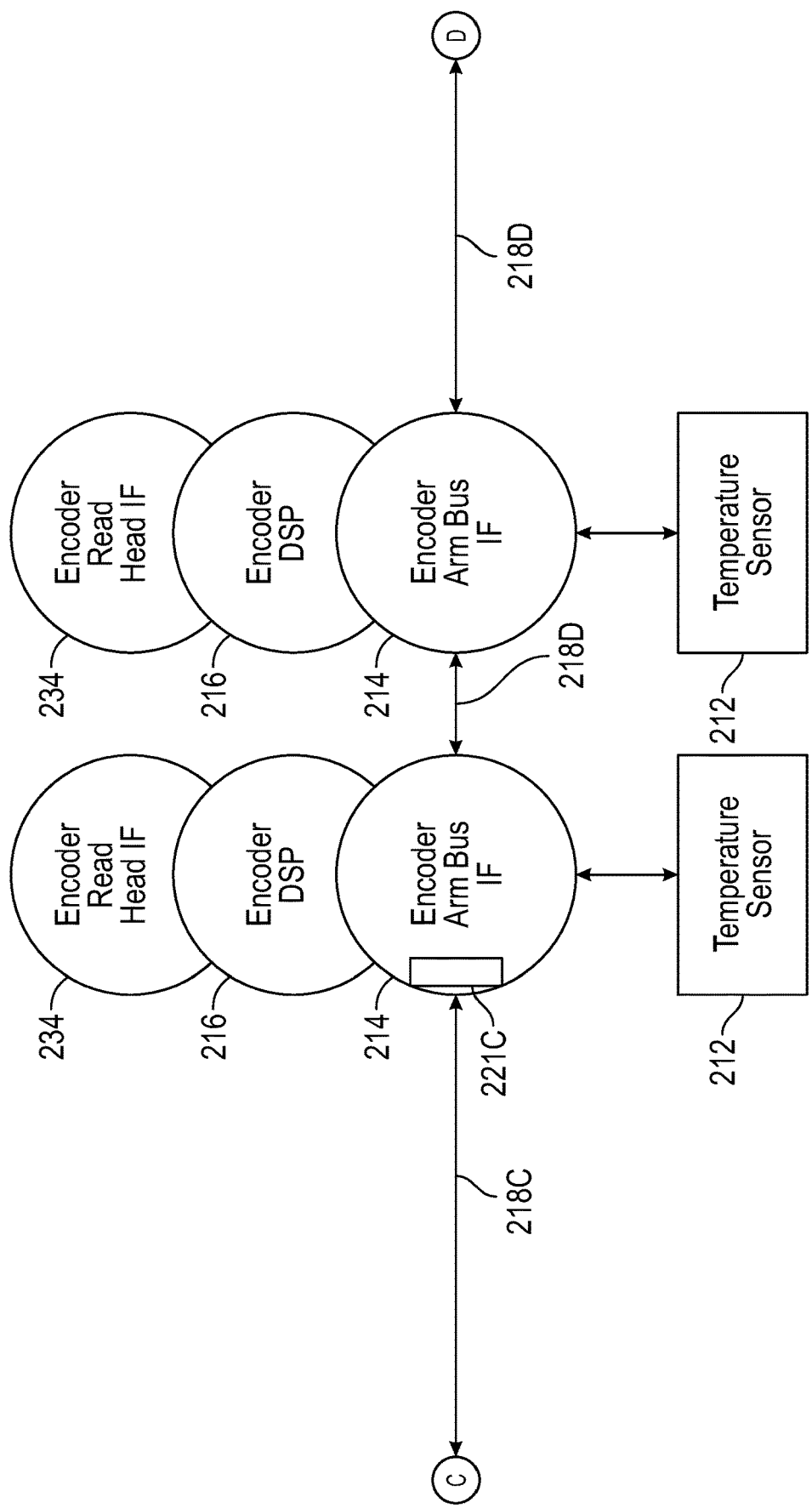

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2A-2D, the electronic data processing system 210 is in communication with the aforementioned plurality of encoder systems via one or more electrical buses 218A, 218B, 218C, 218D. It should be appreciated that the data processing system 210 may include additional components, such as connector 211, for example, that are configured to adapt the incoming and outgoing signals to an electrical bus 218A-218D. For the clarity purposes, not all of these components are shown in FIG. 2. In the embodiment depicted in FIG. 2, each encoder system generates encoder data and includes: an encoder bus interface 214, an encoder digital signal processor (DSP) 216, an encoder read head interface 234, and a temperature sensor 212. Other devices, such as strain sensors, may be attached to the electrical bus 218.

Figure 2E:
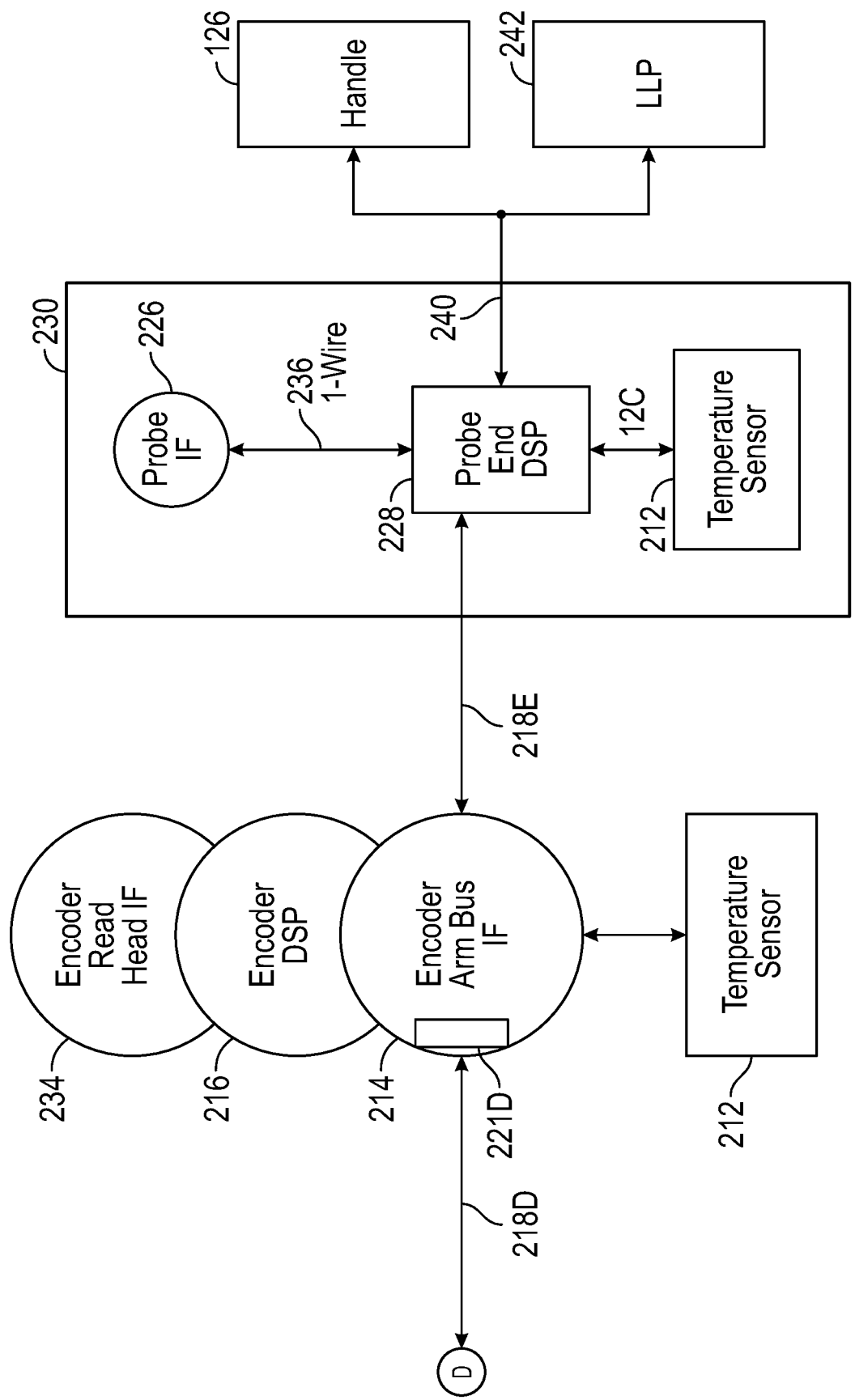

Also shown in FIG. 2E are probe end electronics 230 that are in communication with the electrical bus 218E. The probe end electronics 230 include a probe end DSP 228, a temperature sensor 212, a handle/LLP electrical bus 240 and a bus 241 that connects with the handle 126 or the LLP 242 via the quick-connect interface in an embodiment, and a probe interface 226. The bus 241 may be an electrical bus, an optical bus, or a bus that includes both optical and electrical signals. The quick-connect interface allows access by the handle 126 to the electrical bus 240 and bus 241 for the LLP and other accessories. The electrical bus may contain data lines, control lines, and power lines. The optical bus may contain data lines and control lines. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP electrical bus 240. It should be appreciated that while the electrical bus 218 is discussed as an individual component, the bus 218 may be formed from a plurality of individual bus segments (e.g. bus 218A-218E) that are serially connected to transfer signals within the AACMM 100. As is discussed in more detail herein, each segment may be separated by a rotary cartridge (FIGS. 6-8) having an electrical slip ring 221A-221D.

In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

Figure 3:
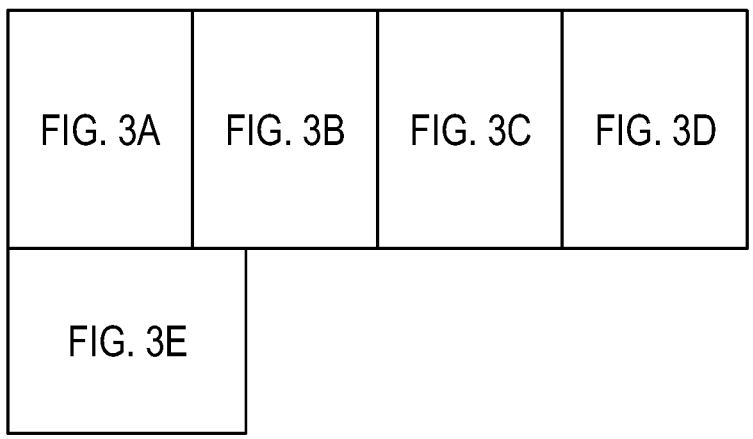
FIG. 3, including FIGS. 3A, 3B, 3C, 3D and 3E taken together, is a block diagram describing detailed features of the electronic data processing system of FIG. 2 in accordance with an embodiment.
Figure 3A:
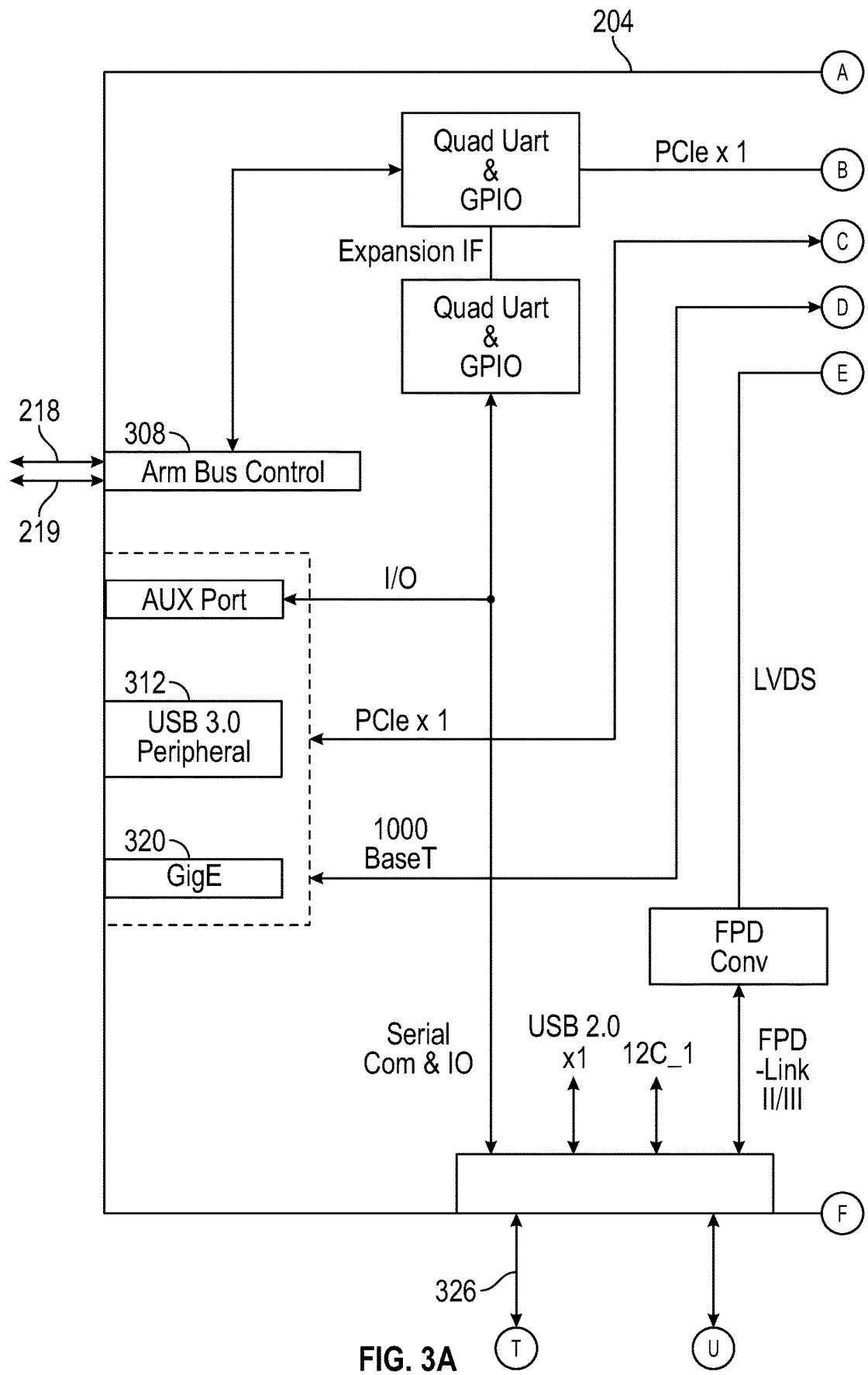
Figure 3B:
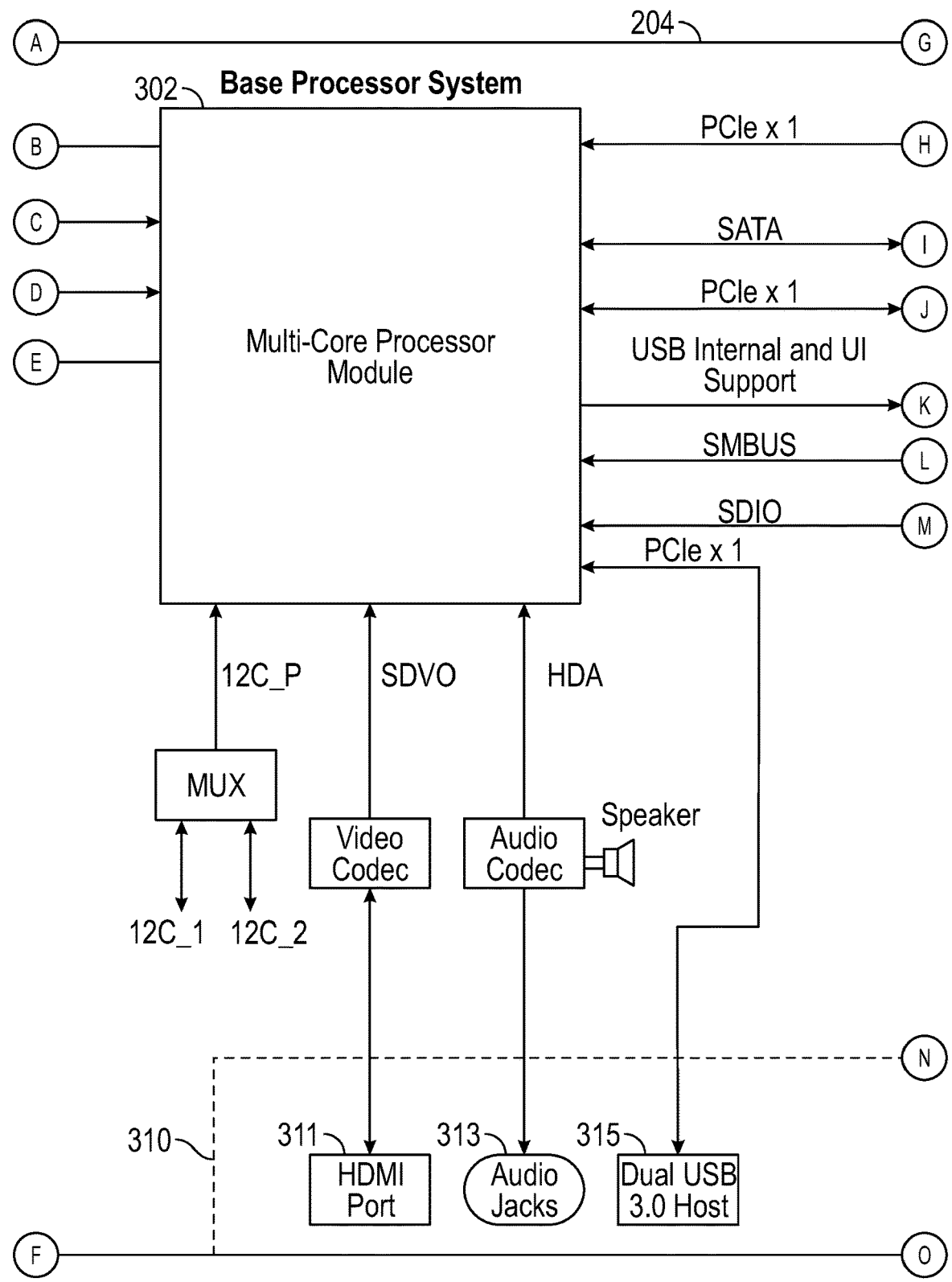
Figure 3C:
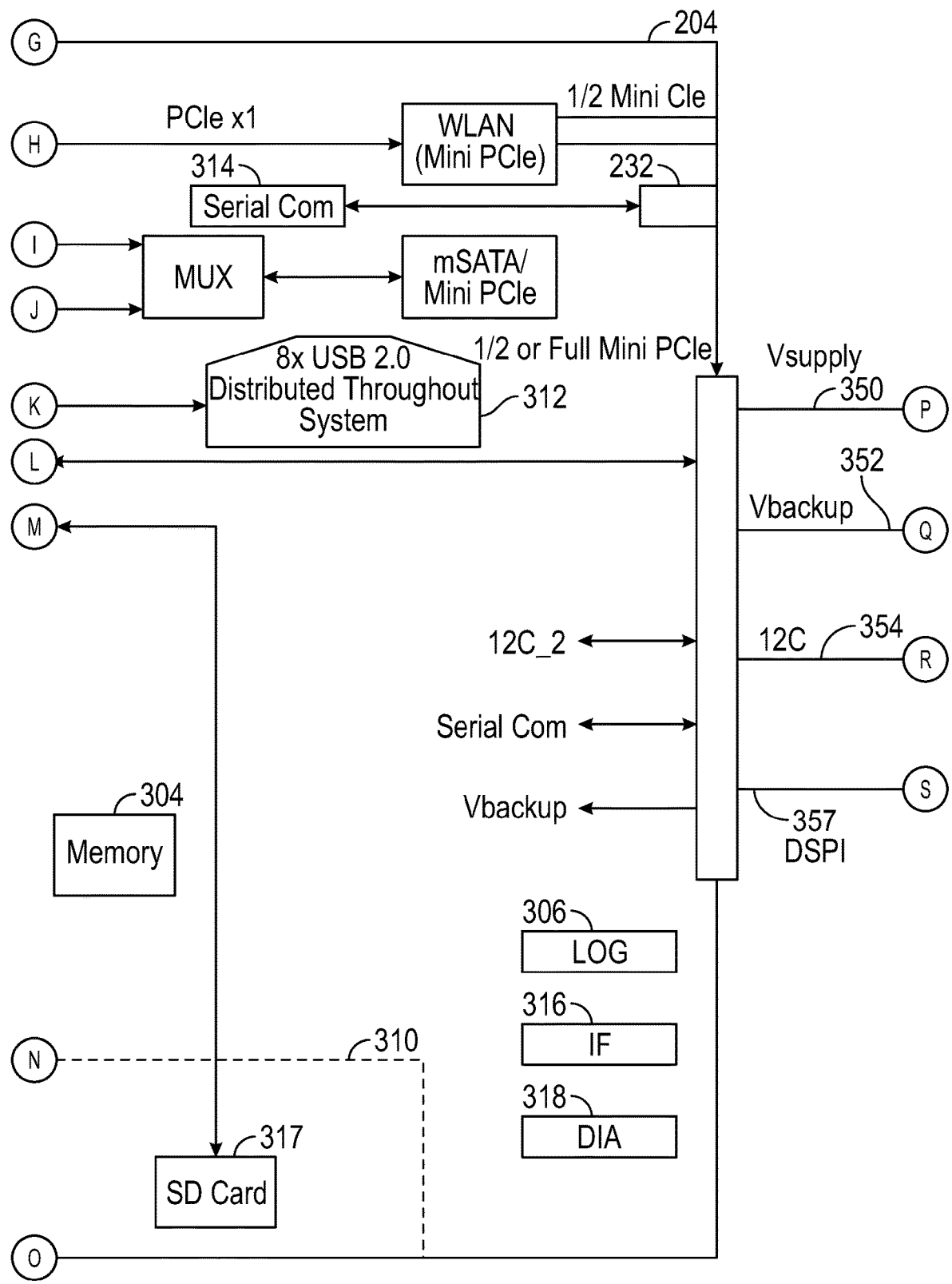
Figure 3D:
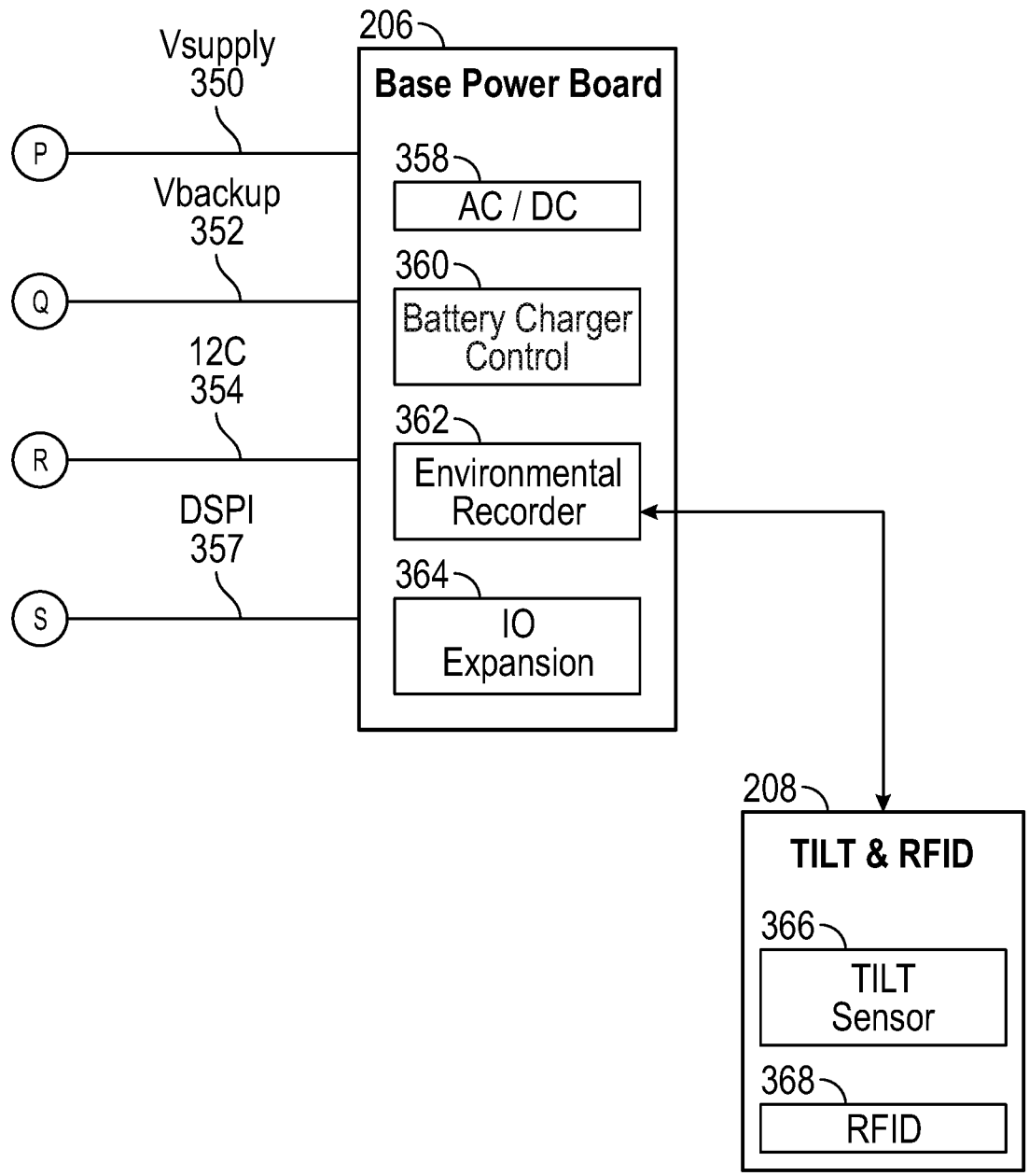
Figure 3E:
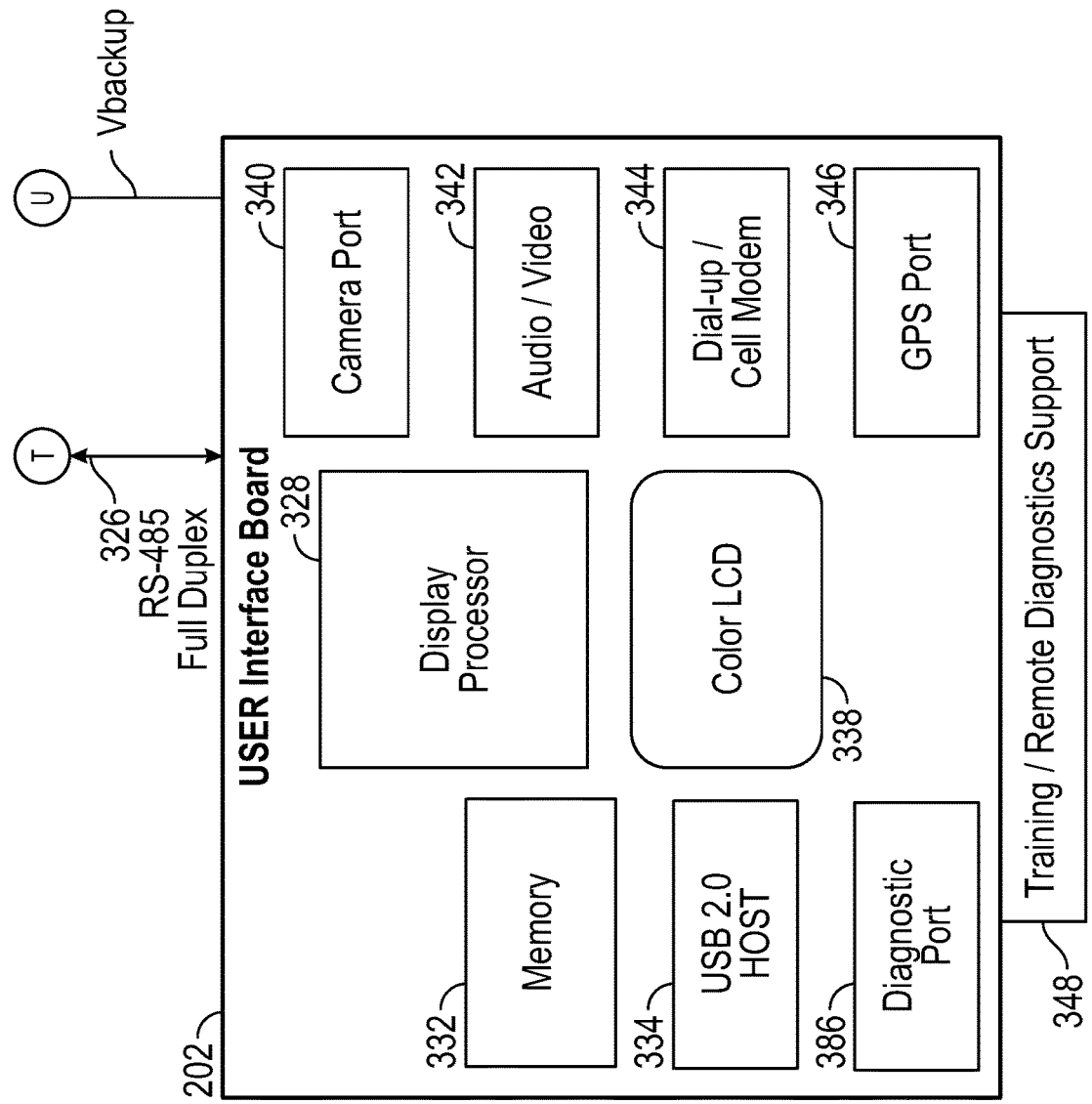

FIGS. 3A-3C are block diagrams describing detailed features of the electronic data processing system 210 (FIG. 2A) of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIGS. 3A-3C, the base processor board 204 includes the various functional blocks illustrated therein. For example, a base processor function 302 is utilized to support the collection of measurement data from the AACMM 100 and receives raw arm data (e.g., encoder system data) via the electrical bus 218 and a bus control module function 308. The memory function 304 stores programs and static AACMM configuration data. The base processor board 204 also includes an external hardware option port function 310 for communicating with any external hardware devices or accessories such as but not limited to a graphical monitor or television via HDMI port 311, an audio device via port 313, a USB 3.0 port 315 and a flash memory (SD) card via port 317 for example. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 328) devices. The base processor board 204 has the capability of communicating with an Ethernet network via a gigabit Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB 3.0) device 312.

The base processor board 204 transmits and collects raw measurement data (e.g., encoder system counts, temperature readings) for processing into measurement data without the need for any preprocessing, such as in the serial box disclosed in the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 4:
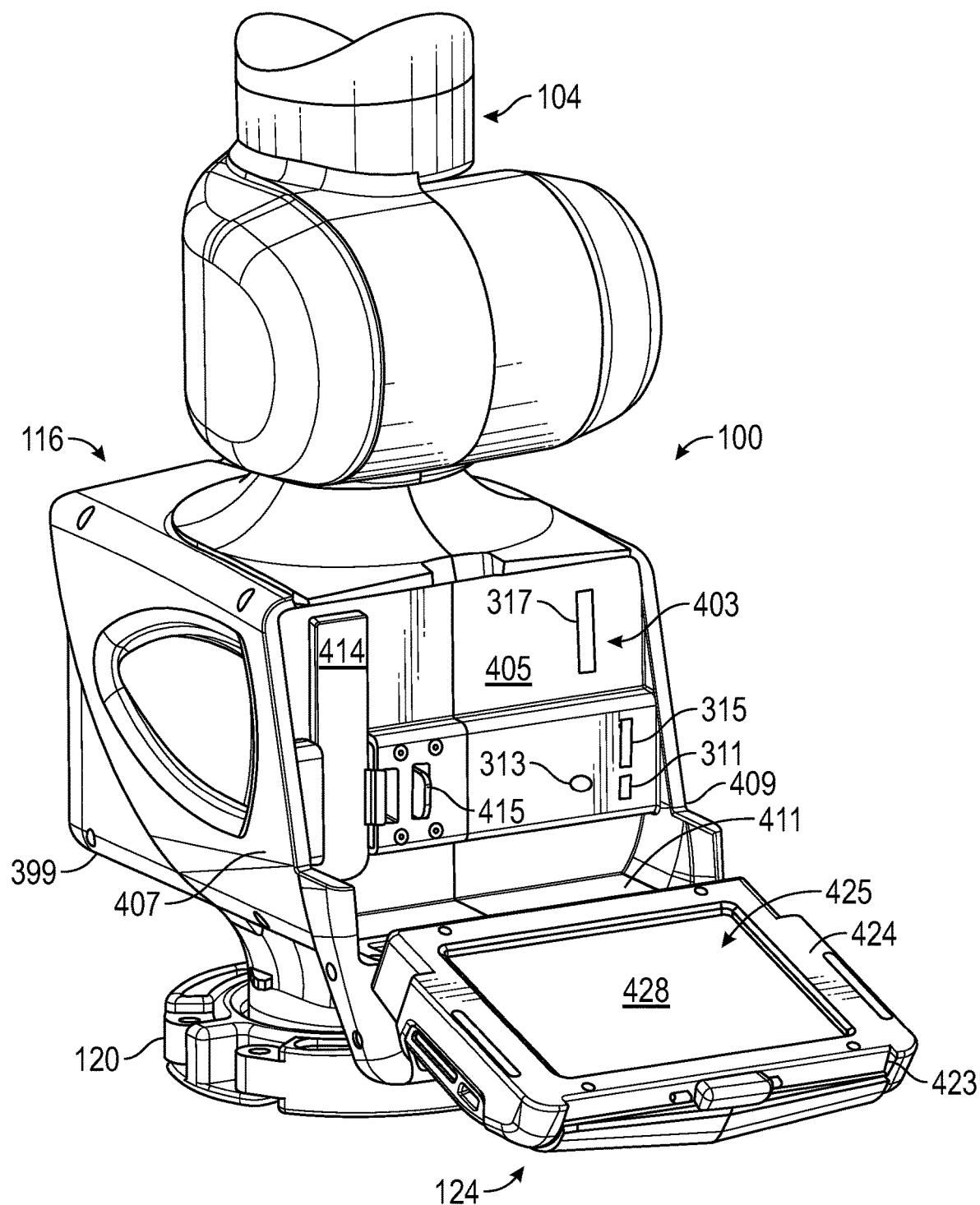
FIG. 4 is a perspective view of the AACMM of FIG. 1.

Referring now to FIGS. 1 and 4, an embodiment is shown of the AACMM 100 having an integrated display. The AACMM 100 includes a base 116 that includes the electronic data processing system 210 that is arranged to communicate with the electrical busses 218. Data carried by electrical bus 218 may come from encoders associated with the bearing cartridge groups 110, 112, 114 or from arm accessories. The base 116 includes a housing 399 with the mounting device 120 on one end and the bearing cartridge grouping 114 and arm portion 104 on an opposite end. On one side, the housing 399 includes a recess 403. The recess is defined by an interior wall 405, a first side wall 407, a second side wall 409 and an end wall 411. The side walls 407, 409 are arranged on an angle relative to the mounting plane of the AACMM 100 such that the recess 403 tapers from the end adjacent the mounting device 120 to the end adjacent the arm portion 104. Adjacent the end wall 411, the housing 399 includes a handle portion 122 that is sized to facilitate the carrying of the AACMM 100 by the operator.

In one embodiment, the recess 403 includes an opening sized to receive a battery 414. The battery 414 is removably disposed in the housing 399 and is secured by a latch 415 that is movably disposed in wall 405. The latch 415 may include a tab portion that engages a surface of the battery 414 and prevents inadvertent removal. The battery 414 may be coupled to a battery pack interface and provide electrical power to the AACMM 100 when the AACMM 100 is not connected to an external power source (e.g. a wall outlet). In the exemplary embodiment, the battery 414 includes circuitry that communicates with the electronic data processing system 210 and transmits signals that may include, but are not limited to: battery charge level; battery type; model number; manufacturer; characteristics; discharge rate; predicted remaining capacity; temperature; voltage; and an almost-discharged alarm so that the AACMM can shut down in a controlled manner.

Also disposed on wall 405 may be one or more external ports that are coupled to electronic data processing system 210, such as flash memory card port 317, USB 3.0 port 315, HDMI port 311 and audio port 313 for example. The external ports are arranged to be accessible to the user when the movable cover portion 124 is moved from a closed position (FIG. 1A) to an open position (FIG. 4).

The movable cover portion 124 includes a housing member 423 that is mounted to hinges that couple the movable cover portion 124 to the end wall 411. In the exemplary embodiment, when in the open position, the movable cover portion 124 is arranged at an obtuse angle relative to the interior wall 404. It should be appreciated that the movable cover portion 124 is continuously rotatable and that the open position may be any position at which the operator can access and utilize the display screen.

The movable cover portion 124 further includes a face member 424 disposed on one side and coupled to the housing member 423. The face member 424 includes an opening 425 sized to allow the viewing of a display 428. The housing member 423 and face member 424 are generally thin wall structures, formed from an injection molded plastic material for example, that define a hollow interior portion. In one embodiment, the housing member 423 or face member 424 may be formed from other materials, including but not limited to steel or aluminum sheet metal for example.

Arranged within the movable cover portion 124 is a display 428 having a display 428. The display 428 is mounted to the face member 424. The display 428 provides a user interface that allows the operator to interact and operate the AACMM 100 without utilizing or connecting an external host computer. The display 428 may include a touch sensitive screen having elements for detecting the touch that include, but are not limited to: resistive elements; surface acoustic wave elements; capacitive elements; surface capacitance elements; projected capacitance elements; infrared photodetector elements; strain gauge elements; optical imaging elements; dispersive signal elements; or acoustic pulse recognition elements. The display 428 is arranged in bidirectional communication with the user interface board 202 and the base processor board 204 such that actuation of the display 428 by the operator may result in one or more signals being transmitted to or from the display 428.

Figure 5:
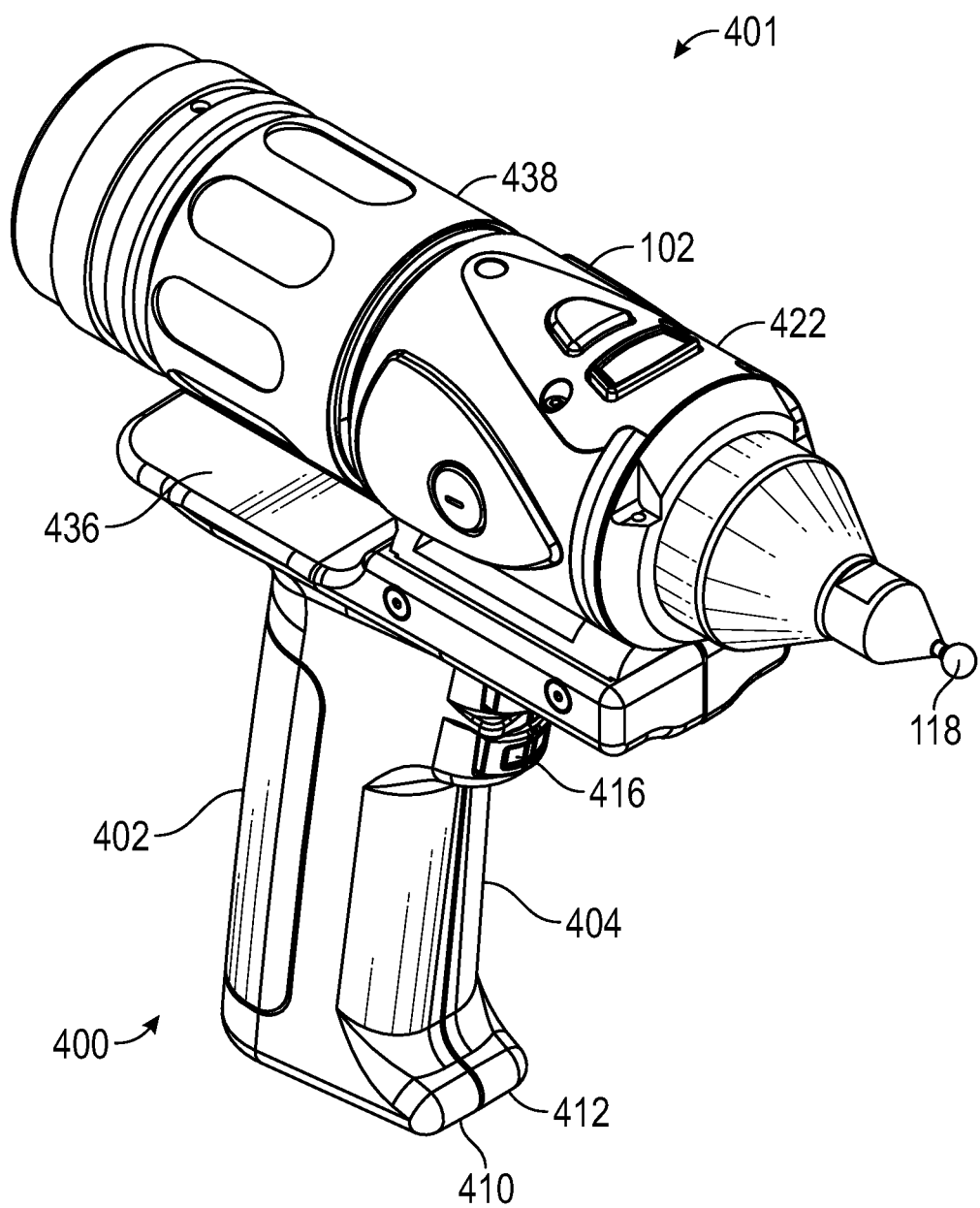
FIG. 5 is a perspective view of the probe end of the AACMM of FIG. 1 with a handle accessory being coupled thereto.

Referring now to FIG. 5, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 may be a thin wall structure having a cavity that houses a controller (not shown). The controller may be a digital circuit, having a microprocessor for example, or an analog circuit. In one embodiment, the controller is in asynchronous bidirectional communication with the electronic data processing system 210 (FIGS. 2 and 3). The communication connection between the controller and the electronic data processing system 210 may be a wireless, a wired (e.g. via bus 218) or an optical connection. The communication connection may also include a direct or indirect wireless connection (e.g. Bluetooth or IEEE 802.11) or a combination of wired, optical and wireless connections. In the exemplary embodiment, the enclosure 402 is formed in two halves, such as from an injection molded plastic material for example. The halves may be secured together by fasteners, such as screws for example. In other embodiments, the enclosure halves may be secured together by adhesives or ultrasonic welding for example.

The handle portion 404 also includes buttons or actuators 416 that may be manually activated by the operator. The actuators 416 may be coupled to the controller that transmits a signal to a controller within the probe housing. In the exemplary embodiments, the actuators 416 perform the functions of actuators 422 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

In one embodiment, the probe end 401 includes a mechanical and electrical interface that cooperates with a second connector on the probe housing 102. The connectors may include electrical and mechanical features that allow for coupling of the device 400 to the probe housing 102, such as that described in commonly owned U.S. Pat. No. 8,533,967 entitled "Coordinate Measurement Machines with Removable Accessories," which is incorporated herein by reference in its entirety. This electrical and mechanical interface provides for a relatively quick and secure electronic connection between the device 400 and the probe housing 102 without the need to align connector pins, and without the need for separate cables or connectors.

The probe housing 102 includes a collar 438 arranged co-axially on one end. The collar 438 includes a threaded portion that is movable between a first position and a second position. By rotating the collar 438, the collar 438 may be used to secure or remove the device 400 without the need for external tools. In one embodiment, rotation of the collar 438 moves the collar 438 along a relatively coarse, square-threaded cylinder (not shown). The use of such relatively large size, square-thread and contoured surfaces allows for significant clamping force with minimal rotational torque. The coarse pitch of the threads further allows the collar 438 to be tightened or loosened with minimal rotation.

The coupling of the probe end 401 to the end of the arm portion 104 creates a communication connection between the bus 218 and the transceiver 421. This coupling further creates a communication connection between the contact probe 118 and the electronic data processing system 210. In this manner, signals may be transmitted and received over bus 218. It should be appreciated that it is desirable for the segments 106, 108 of the arm portion 104 and the probe end 401 to be rotatable on several axis of rotation to allow the probe end 401 to be positioned to make a desired measurement without inhibiting the user. As a result, one or more electrical connections are made at each of the bearing cartridge groupings 110, 112, 114 for each rotational joint. These connections allow the arm portion 104 to be moved and rotated without interference from electrical conductors or optical conductors.

Figure 6:
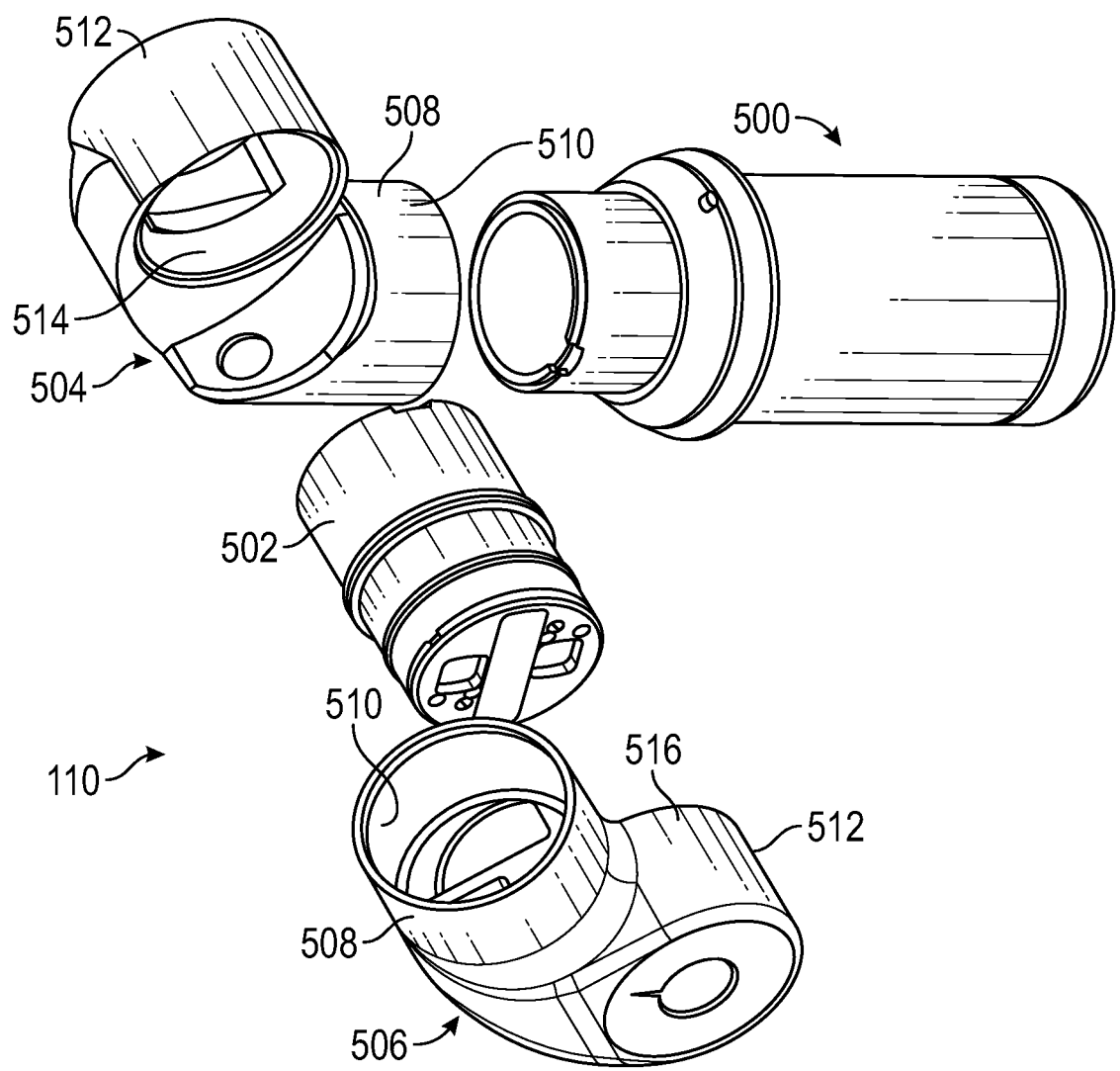
FIG. 6 is a partial exploded view illustrating a pair of encoder/bearing cartridges being assembled between two dual socket joints in accordance with an embodiment.
Figure 7:
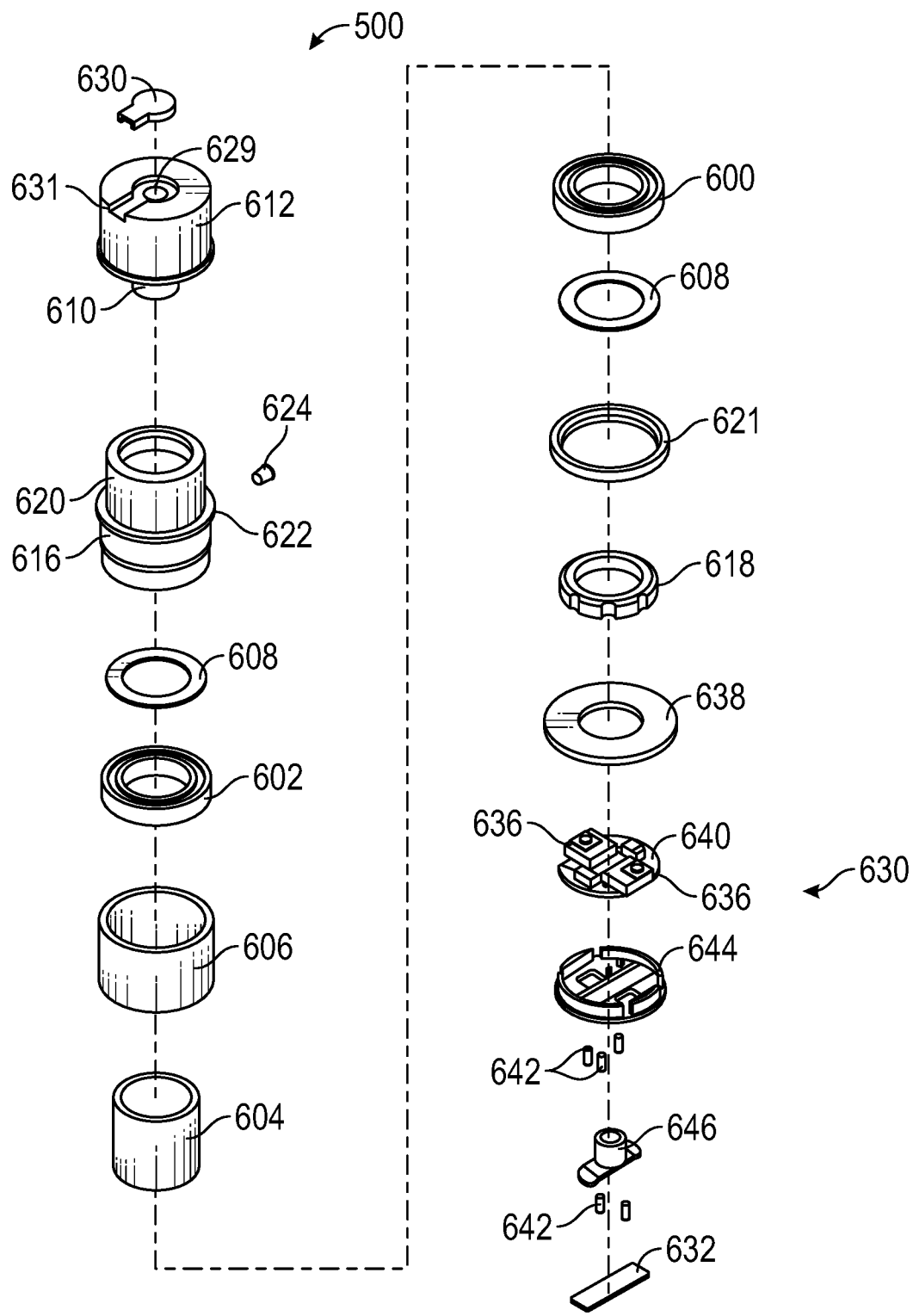
FIG. 7 is an exploded perspective view illustrating of the encoder/bearing cartridge of FIG. 6.
Figure 8:
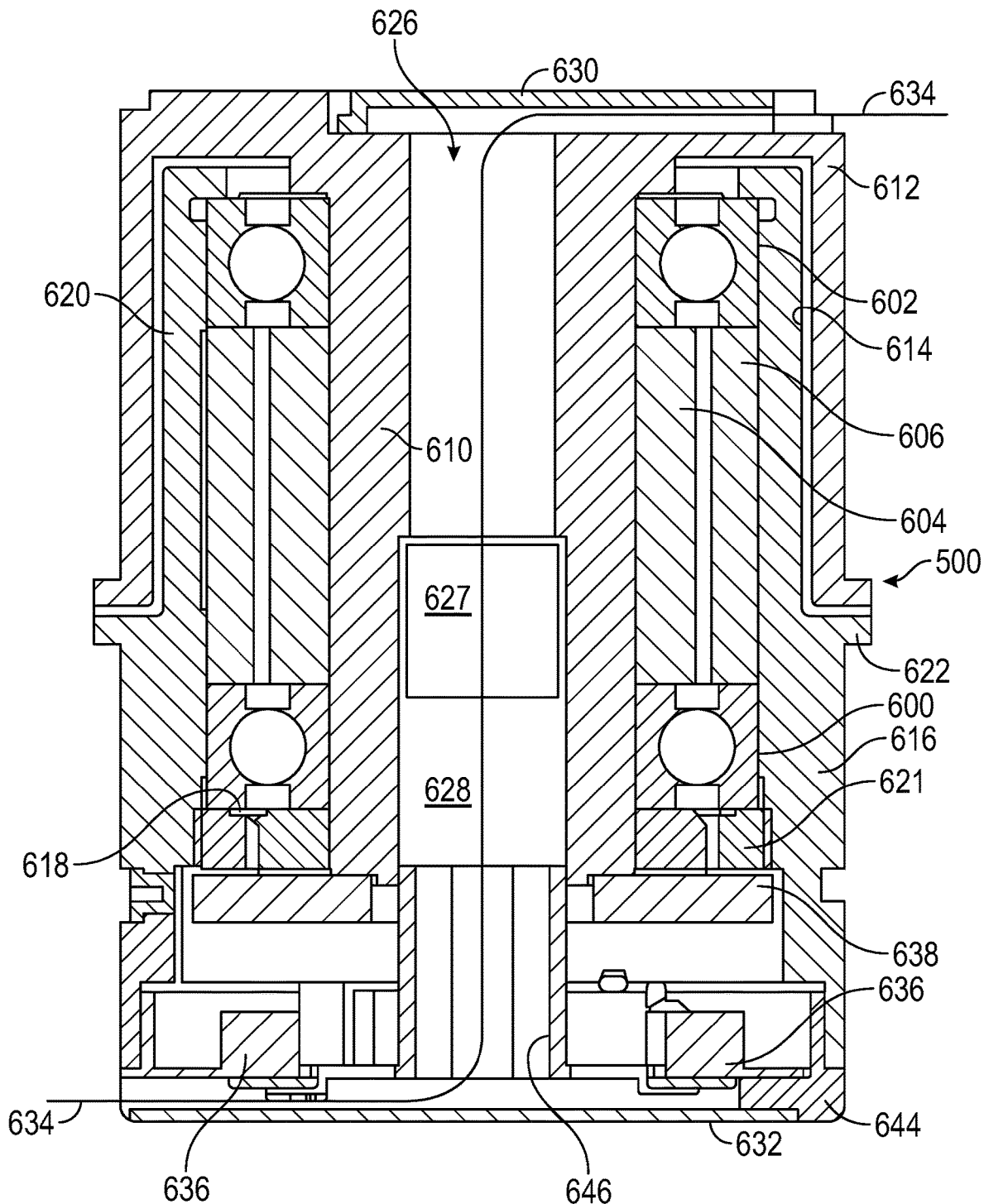
FIG. 8 is a side sectional view of the cartridge of FIG. 6.

Referring now to FIGS. 6-8, an exemplary embodiment is shown of an arm rotational connection using groupings of bearing cartridges, such as bearing cartridge grouping 110 for example, that include a slip ring assembly that allows for rotation of the arm segments. As discussed above, each of the rotational connections of the articulated arm utilizes a modular bearing/encoder cartridge such as cartridge 500 or cartridge 502 for example. These cartridges 500, 502 are mounted in the openings of dual socket joints 504, 506. Each socket joint 504, 506 includes a first cylindrical extension 508 having a first recess or socket 510 and a second cylindrical extension 512 having a second recess or socket 514. Generally sockets 510, 514 are positioned 90° to one another although other relative angular configurations may be employed. Cartridge 502 is positioned in each socket 516 of dual socket joints 504, 506 to define a hinge joint, while cartridge 500 is positioned in socket 510 of joint 506 to define a longitudinal swivel joint. Modular bearing/encoder cartridges 500, 502 provide advantages in permitting separate manufacturer of a pre-stressed or preloaded dual bearing cartridge on which is mounted the modular encoder components. This bearing encoder cartridge can then be fixedly attached to the external skeletal components, such as dual socket joints 504, 506 for example, of the articulated arm portion 104. The use of such cartridges is advantageous in permitting high-quality, high-speed production of these sophisticated subcomponents of articulated arm portion 104.

In some embodiments, there may be as many as four or more different cartridge types, for example two "long" axial cartridges that allow for swivel rotation, and two "short" cartridges that provide a hinge joint. Each cartridge includes a pre-loaded bearing arrangement and a transducer which may comprise a digital encoder. While the length of the cartridge may change, for exemplary purposes, we will describe all types of cartridges with respect to cartridge 500.

The cartridge 500 includes a pair of bearings 600, 602 separated by an inner sleeve 604 and an outer sleeve 606. It is desirable that the bearings 604, 606 be pre-loaded. In one embodiment, the preload is provided by the sleeves 604, 606 being different lengths (inner sleeve 604 is shorter than the outer sleeve 606 by approximately 0.0005 inches) so that upon tightening, a preselected preload is generated on bearings 600, 602. Bearings 600, 602 may be sealed using seals 608 and rotatably mounted on shaft 610. At its upper surface, shaft 610 terminates at a shaft upper housing 612. An annulus 614 (FIG. 8) is defined between shaft 610 and shaft upper housing 612. This entire assembly 600, 602, 608, 610 is positioned within outer cartridge housing 616 with the shaft 610 and its bearing assembly 600, 602 being securely attached to housing 616 using a combination of an inner nut 618 and an outer nut 621. In one embodiment, upon assembly the upper portion 622 of housing 616 may be received within annulus 614. It should be appreciated that the aforementioned preload is provided to bearings 600, 602 upon the tightening of the inner and outer nuts 618, 621 which provide compression forces to the bearings and, due to the difference in length between the sleeves 604, 606, the desired preload will be applied.

In the exemplary embodiment, bearings 600, 602 are duplex ball bearings. In order to obtain the desired level of pre-load, it is desired that the end surfaces of the bearings be parallel. This parallelism affects the evenness of the pre-loading about the circumference of the bearing. Uneven loading may give the bearing a rough, uneven running torque feel and may result in radial run out and reduced encoder performance. Radial run out of the modularly mounted encoder disk may result in an undesirable fringe pattern shaft beneath the encoder head, which can result in encoder angular measurement errors. As discussed in more detail below, errors due to the radial run out may be measured and compensated for once the cartridge 500 has been assembled.

The angular error of the cartridge 500 is directly related to the separation of the bearings 600, 602. The angular error decreases as the separation of the bearings 600, 602 increases. The sleeves 604, 606 may be used to enhance the separation of the bearings 600, 602. In one embodiment, the cartridge housing 616 and the sleeves 604, 606 are made from aluminum and are precision machined in length and parallelism. As a result, changes in temperature should not result in differential expansion which could compromise pre-load. As previously mentioned, the pre-load is established by the difference in length between the sleeves 604, 606. Once the nuts 618, 620 are fully tightened, this differential in length will result in the desired bearing pre-load. The use of seals 608 provide sealed bearings since contaminants would affect rotational movement and encoder accuracy, as well as joint feel.

It should be appreciated that while cartridge 500 is illustrated as having a pair of spaced bearings, the cartridge 500 may include a single bearing or three or more bearings. Thus, each cartridge includes at least one bearing.

In the exemplary embodiment, the cartridges may have unlimited rotation. In other embodiments, the cartridge may be limited to rotation over a defined angular range. For limited rotation, a groove may be formed on a flange 622 on the outer surface of housing 616, which provides a cylindrical track to receive a shuttle 624. The shuttle 624 rides within the groove until it abuts a removable shuttle stop, such as a set screw (not shown), whereupon further rotation is precluded. The amount of rotation can vary depending on what is desired. In one embodiment, the shuttle rotation is limited to less than 720 degrees.

In other embodiments, the cartridge may be configured for unlimited rotation. In this latter case, a slip-ring assembly 627 is used. In one embodiment, the shaft 610 has a hollow or axial opening 626 therethrough, which has a larger diameter section 628 at one end. On one end of the axial opening 628 is a slip ring assembly 627. The slip ring assembly 627 may consist of any commercially available slip ring, in one embodiment, the slip ring assembly 627 comprises an H-series slip ring available from IDM Electronics Ltd. of Reading, Berkshire, United Kingdom. The slip ring assembly is non-structural with respect to the preloaded bearing assembly. The slip ring assembly 630 provides no mechanical function but only provides electrical or signal transfer functions. Axial opening 628 at an aperture 629 which communicates with a channel 631 sized and configured to receive wiring 634 from the slip ring assembly 627. Such wiring is secured in place and protected by a wire cover 630, which is snapped onto and is received into the channel and aperture.

As discussed herein, cartridge 500 includes both a preloaded bearing structure and an optical encoder structure. In the exemplary embodiment, the optical encoder structure includes a read head 636 and a grating disk 638. In this embodiment, a pair of read heads 636 is positioned on a read head connector board 640. Connector board 640 is attached via fasteners 642 to a mounting plate 644. Grating disk 638 is attached to the lower surface of shaft 610, such as with an adhesive for example, and is spaced apart from and in alignment with read heads 636. A wire funnel 646 and sealing cap 632 provide the final outer covering to the end of housing 616. Wire funnel 646 captures and retains the wiring 634. It should be appreciated that the encoder head disk 638 will be retained and rotate with shaft 610. It should be further appreciated that while the illustrated embodiment shows two read heads 636, more than two read heads or a single read head may alternatively be used. Still further, in other embodiments, the positions of the read head 636 and the grating disk 638 may be reversed whereby the read head 636 rotates with the shaft 610.

Figure 9B:
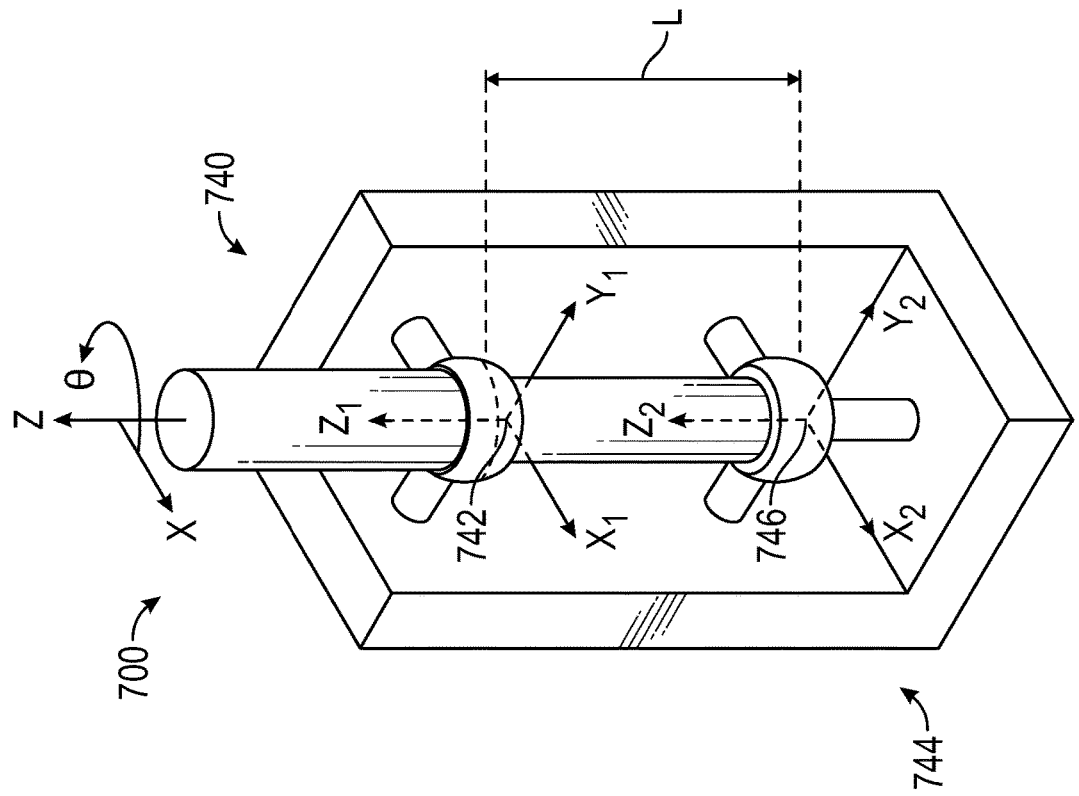
FIGS. 9A and 9B are perspective views of a prior art apparatus that measures bearing errors.
Figure 9A:
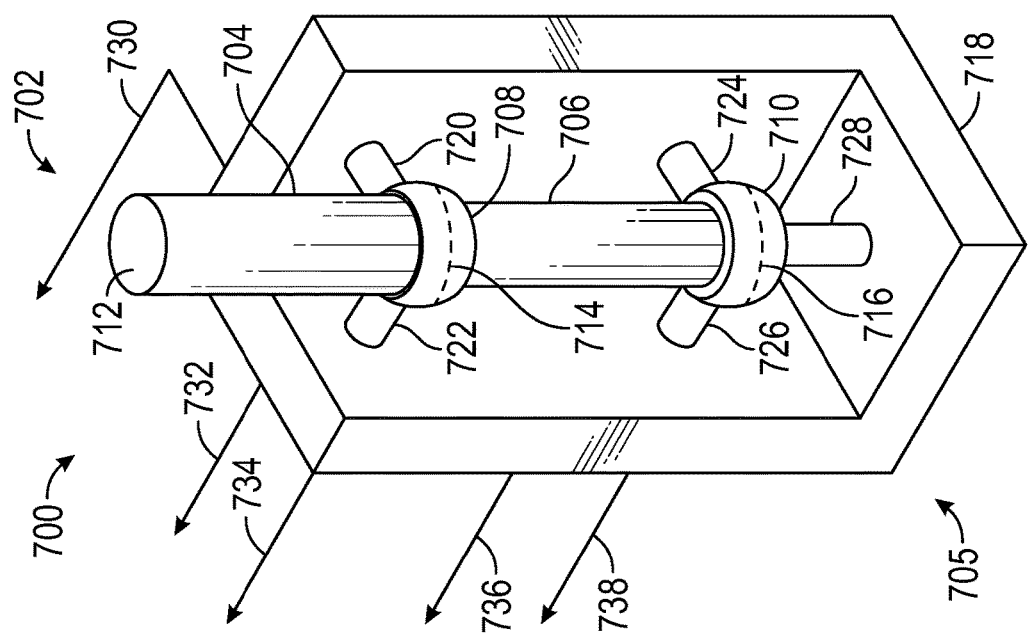

As discussed above, bearing run out errors may result in errors angular rotations of the cartridge 500 as determined by the encoder measurements. It should be appreciated that it is desirable to reduce or substantially eliminate such errors to obtain higher levels of accuracy in the AACMM measurements. Referring now to FIGS. 9A and 9B, a prior art apparatus 700 is shown for measuring bearing runout error. The apparatus 700 includes a rotating assembly 702 and a fixed assembly 705. The rotating assembly 702 includes a first shaft portion 704, a second shaft portion 706, a first sphere portion 708 and a second sphere portion 710. The first shaft portion 704 has a surface 712 that attaches to a transfer element (not shown), which is then attached to a rotating structure under test. In one embodiment, the spheres are lapped to a form error of 50 nanometers or less. The first sphere portion 708 has a first equator 714 that is a great circle of the sphere and is aligned perpendicular to the first and second shaft portions 704, 706. The second sphere portion 710 has a first equator 716 that is a great circle of the sphere and is also aligned perpendicular to the first and second shaft portions 704, 706. The fixed assembly 705 includes a frame 718 and a plurality of capacitive sensors 720-728 that are rigidly affixed to the frame 718. Electrical connections 730-738 connect to the sensors 720-728 and transmit signals to an external electrical circuit or processing system (not shown). In an embodiment, capacitive sensors 720, 722 are aligned perpendicular to the first sphere portion 708 at the first equator 714. The capacitive sensors 724, 726 are aligned perpendicular to the second sphere portion 710 at the first equator 716. The capacitive sensors 720, 722 are spaced apart from the first sphere portion 708 to reduce the risk of collision with the sensors 724, 726 during operation. The capacitive sensor 708 is positioned 90 degrees from capacitive sensor 722. The fixed assembly 705 is attached to a non-rotating structure. In an embodiment, the frame 718 is attached to the fixed structure that holds the housing (stator) of the cartridge (spindle).

In one embodiment, capacitive sensors 724, 726 are also spaced about 20 micrometers from the second sphere portion 710. The capacitive sensor 724 is positioned 90 degrees from the capacitive sensor 726. In the exemplary embodiment, the capacitive sensor 728 is aligned co-axially with the second sphere portion 710 and the second shaft portion 706. In another embodiment, the capacitive sensor 728 is not provided in the apparatus 700.

In another embodiment, the rotating portion 702 includes a single cylindrical shaft without any sphere portions. Such a cylindrical shaft may be machined, coated with a nickel, and ground to a form error (cylindricity) of 50 nm or less. The capacitive sensors may be positioned directly within about 20 micrometers of the cylindrical shaft as in the earlier embodiment. In other embodiments, shapes besides the cylindrical shaft or cylindrical shaft with spherical portions are used.

In another embodiment, only two capacitive sensors, for example, the sensors 722, 726 or the sensors 720, 724, are used. Because each of the capacitive sensors captures information for the full 360 degree rotation, in principle, two properly aligned capacitive sensors provide complete runout information.

Referring now to FIG. 9B, the apparatus 700 is illustrated depicting the axis of rotation z and an angle of rotation θ. The angle θ is taken with respect to an axis x perpendicular to the z axis. The first sphere portion 708 has a first frame of reference 740 that includes an origin 742, which is located at the center of the spherical surface of the first sphere portion 708. The first frame of reference 740 has an axis z1 aligned with the axis of the first and second shaft portions 704, 706 and with the axis z. The axis x1 is aligned with the capacitive sensor 720 and the axis y1 is aligned with capacitive sensor 722. The axes x1, y1, z1 are mutually perpendicular.

The second sphere portion 710 has a second frame of reference 744 that includes an origin 746 at the center of the spherical surface of the second sphere portion 710. The second frame of reference 744 has an axis z2 aligned with the axis of the first and second shaft portions 704, 706 and with the axis z. The axis x2 is aligned with the capacitive sensor 724 and the axis y2 is aligned with capacitive sensor 726. The axes x2, y2, z2 are mutually perpendicular. The capacitive sensor 728 is aligned with the z axis near the bottom of the second sphere portion 710. The distance between the first origin 740 and the second origin 744 along the z axis is the distance L.

For the embodiment in which a single cylindrical shaft is used in place of a cylindrical and sphere combination as in FIGS. 9A, 9B, the same axes x1, y1, z1 and x2, y2, z2 are still used, with the origins corresponding to 742, 746 along the axis of symmetry of the cylindrical shaft. The axes may also be for the case in which only two capacitive sensors, for example 722, 726 or 720, 724, are present.

For each angle θ, the apparatus 700 measures five displacements associated with each of the capacitive sensors 720-728. These displacements are $\Delta x1$, $\Delta y1$, $\Delta x2$, $\Delta y2$ and $\Delta z$, respectively. From these displacements, tilt angles $\alpha x$ and $\alpha y$ resulting from the bearing errors may be obtained:

$$\alpha x = (\Delta x1 - \Delta x2)/L, \qquad (1)$$

$$\alpha x = (\Delta y1 - \Delta y2)/L, \qquad (2)$$

In the past, bearing calibration techniques have been used mostly for measuring high speed spindles of precision machining tools, such as diamond turning machines, lathes, milling machines, grinders and the like. Usually bearing calculations are performed first to ensure that a machine tool meets specifications and second to find ways to change machine tool design to improve tool performance. Since machine tools cannot be adjusted while machining operations are performed, it is usually not possible to correct the behavior of the machine tools while machining operations are underway.

For any 360 degree rotation of a quality bearing, it is usually the case that bearing error repeats its motion almost exactly as a function of the rotation angle θ. In other words, if the bearing is moved back and forth over the same 360 degree window, the pattern of errors recorded by the capacitive sensors is almost the same for any give angle θ. However, for the most part bearing errors do not repeat over different cycles of 360 degrees. This behavior is explained in a tutorial on "Precision Spindle Metrology" presented by Eric R. Marsh at the annual meeting of the American Society for Precision Engineering accessed from the internet site http://www.scribd.com/doc/132020851/Spindle-Tutorial on 2 May 2013, the contents of which are incorporated by reference herein in its entirety.

FIG. 10A is a plot 750 of data 752 obtained from a measurement of bearing errors in a lathe spindle. The plot shows data obtained from a single capacitive sensor in an arrangement similar to that of FIGS. 9A and 9B but with a single sphere rather than five spheres. The maximum values observed in the 32 turns of the shaft are seen to be to lie generally within the range of +/−600 nm. An observation that can be immediately made from the plot is that the measured values are different for each of the 32 turns of the shaft.

FIG. 10B is a plot 754 of data 756 for three cycles within the box 758 in FIG. 10A. A sinusoidal curve 760 is fit to the data 756 and the average of the sinusoidal curve is extracted as line 762. The sinusoidal curve results largely from the difficulty in perfectly centering the first sphere portion 708 and the second sphere portion 710 on the axis of rotation. Because it is generally not possible to perfectly center these spheres on the axis of rotation, the fundamental sinusoidal component is removed during processing of collected data. FIG. 10C is a plot 764 of the bearing error 766, obtained by subtracting the values of the sinusoid 760 from the measured data 756. The subtracting the fundamental sinusoidal component from the collected data is performed only on the capacitive sensors 720-726, which measure radial (side-to-side) displacements, and not on capacitive sensor 728, which measures axial displacement. For axial displacement, the fundamental sinusoidal variation is meaningful and is not subtracted from the collected data.

Figure 11:
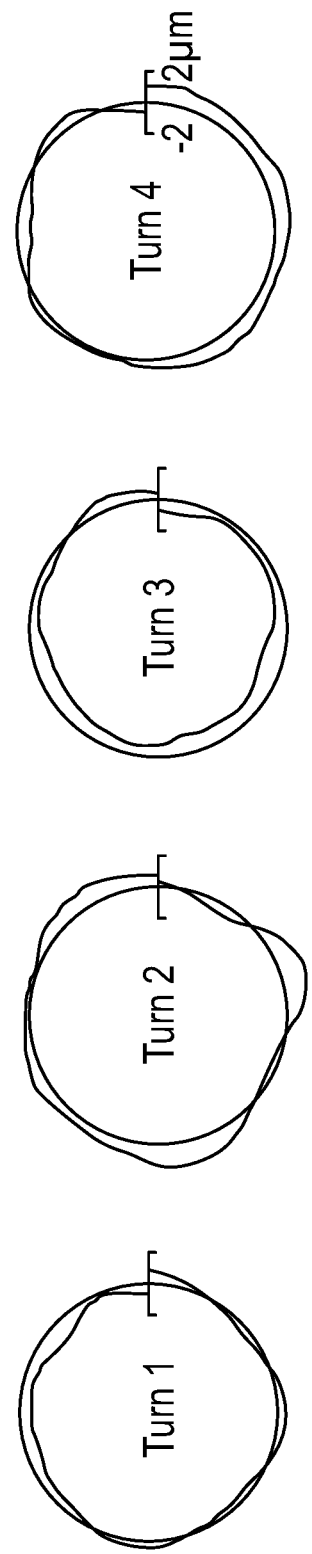
FIG. 11 shows four consecutive rotations of a spindle that contains two bearings.

In general, bearings do not return to their initial displacement after a rotation of 360 degrees. This effect is illustrated in FIG. 11, which shows four consecutive rotations of a spindle that contains two bearings. Turn one begins in the rightmost direction at 0 degrees with an error of between 0 and −1 micrometers. It rotates counterclockwise and after 360 degrees has an error of between 0 and +1 micrometer. The error at an angle of zero degrees for the second turn is the same as the error at 360 degrees for the first turn. By studying the four turns, it can be seen that no two of the turns has the same errors. These results dispel an often held notion that bearing error patterns repeat every 720 degrees.

Figure 12:
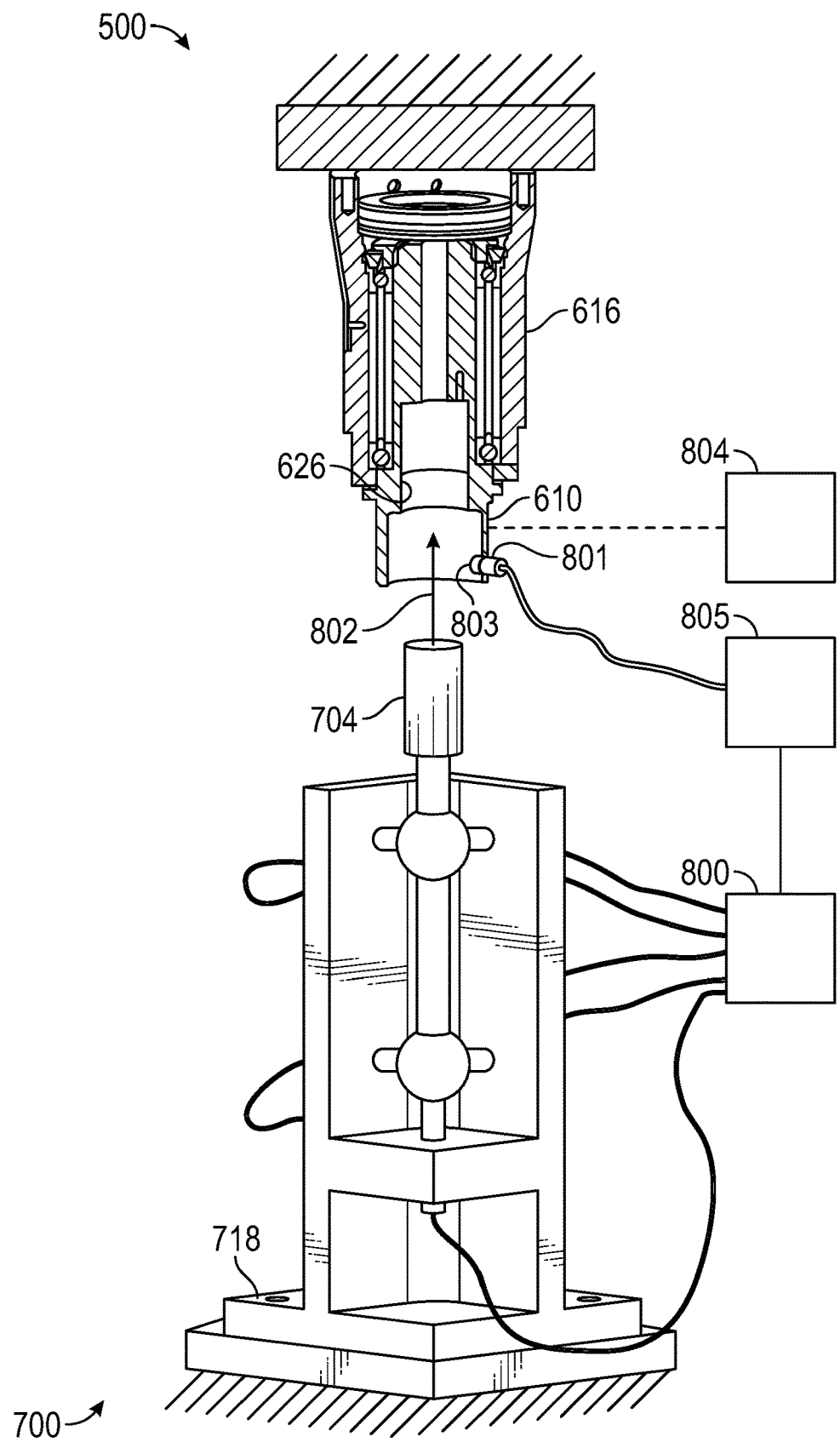
FIG. 12 is perspective view, partially in section, of an encoder/bearing cartridge and a bearing runout measurement apparatus according to an embodiment of the invention.

Referring now to FIG. 12, an embodiment is illustrated of a cartridge 500 coupled to the bearing measurement apparatus 700. The bearing measurement apparatus 700 is coupled to an electrical or processing circuit 800. The first shaft portion 704 is configured to rigidly attach to the axial opening 626 (FIG. 8) of cartridge 500, allowing no relative movement between 704 and 626. The arrow 802 indicates an attachment location. A transfer element 806 (FIGS. 13-16) may be added to join the first shaft portion 704 to the shaft 610. As will be discussed in more detail below, a drive system 804 is coupled to rotate the shaft 610. The drive system 804 is configured to balance the torque to the shaft 610 and also isolate error motions in the drive mechanism from the shaft 610. The housing 616 of cartridge 500 is configured to rigidly attach to frame portion 718 of measuring apparatus 700, to reduce or minimize the relative motion between housing 616 and frame portion 718.

Bearing errors are generally very repeatable over any 360 degree interval. However, there may be significant variations over different 360 degree intervals. To substantially eliminate bearing errors, it is helpful to limit the range of rotation of the shaft 610 to those angular regions for which bearing calibration data has been taken and to keep track of the rotation angle of the axles during operation. Further, in the exemplary embodiment keeping track of current 360 degree rotation interval is performed even when the angular encoder sensor power is off. In an embodiment, this is done by associating a non-volatile rotation monitor to the shaft 610. In one embodiment, the rotation monitor is a tachometer 801, such as a Hall Effect sensor for example. The tachometer 801 is electrically coupled to the processing circuit 800 during calibration. The sensor includes a target 803, such as a magnet for example, attached to the shaft 610, such as on the inside surface of axial opening 626. Each time the target 803 passes the sensor 801, the sensor 801 produces a signal that indicates the direction of movement. An rotational counter, such as an electrical or mechanical counter, keeps track of the number of revolutions. It should be appreciated that many different physical quantities may be measured by the sensors 801, such as but not limited to capacitance, inductance, magnetism and light. In one embodiment, if rotation is outside of the range which bearing calibration data has been taken, the AACMM may provide a warning message to the user. Electrical signals from the sensor 801 may be transmitted to a circuit board 805 for processing. The circuit board 810 may utilize power from the base power board 206 during normal operation and include a battery to provide non-volatile operation of the rotation monitor when power from the base power board 206 is not available.

In another embodiment, the sensor may be a mechanical sensor that responds mechanically to rotation of the axle and keep track of the current 360 degree range of the axle. The mechanical sensor may count the number of axle rotations without requiring electrical power for its operation. For example, springs may be used to provide a measurable amount of tension correlated to the number of rotations of the shaft 610. In one embodiment, stops are used to limit the range of rotation.

In an embodiment where a mechanical sensor is used, an operator may set the mechanical counter to a starting position whenever power is reapplied. Thereafter, the angular encoders keep track of the rotation count about their axles. Many types of mechanical counters may be used. In an embodiment, the mechanical counter is a Geneva drive, which is a gear mechanism that translates a continuous rotation into an intermittent rotary motion.

Some angle measuring devices, such as angular encoders for example, are configured to measure between 0 and 360 degrees. To keep track of the overall rotation angle, it is customary to speak of unwrapped angles. For example, an angle that drops between 0 degrees, say to −10 degrees for example, has a wrapped angular reading of 350 degrees but an unwrapped value of −10 degrees. Similarly an angle that exceeds 360 degrees by 10 degrees would have a wrapped angular reading of 10 degrees and an unwrapped value of 370 degrees.

The rotation monitor, such as sensor 801 for example, may be a bidirectional counter, which means that it keeps track of the number of forward counts and reverse counts. An axle that completes five rotations in the forward direction and two rotations in the reverse direction has a rotational value of 5−2=3 rotations in the forward direction relative to an origin or home position. The net rotational value may be combined with the angle between 0 and 360 degrees measured by an angular measuring device such as an angular encoder to obtain the unwrapped angle: unwrapped angle=wrapped angle+(net rotational value)(360), where it is understood that the net rotational value may be positive or negative.

In one embodiment, the during the calibration process described herein, the cartridge is rotated a sufficiently large number of rotations (e.g greater than 10 to 100 revolutions) in both the forward and reverse directions from the origin or home position to allow the operator to use the AACMM and maintain the cartridge within the predetermined number of rotations of the home position during operation. In one embodiment, the number of rotations in the forward direction (e.g. +100 rotations) and reverse direction (e.g. −100 rotations) used in the calibration process is stored in memory on the AACMM. In this embodiment, an alarm may be emitted to alert the operator when the net rotational value is approaching or exceeds the number of rotations used in the calibration process in the forward direction (e.g. +100 rotations) or is approaching or less than the number of rotations in the reverse direction (e.g. −100 revolutions). It should be appreciated that while embodiments herein describe the number of revolutions used in the calibration process in the forward and reverse directions as being the same, this is for exemplary purposes and the claimed invention should not be so limited. In other embodiments, the calibration process may use a different number of revolutions in the forward and reverse directions.

It should be appreciated that the rotation value and angle of the cartridge shaft is associated with the measured displacements measured by the bearing measurement apparatus 700. As a result, a compensation value or a plurality of compensation values may be determined for a given bearing cartridge for each angle of rotation and each rotational value that is measured during the calibration process. These compensation values from each of the bearing cartridges in the AACMM 100 may then be stored in memory, such as memory function 304 or a flash memory card for example. The stored compensation values may be utilized by the electronic data processing system 210 to account for bearing runout errors, the tilt/wobble errors and improve the accuracy of the three-dimensional coordinate values measured by the AACMM 100.

Figure 13:
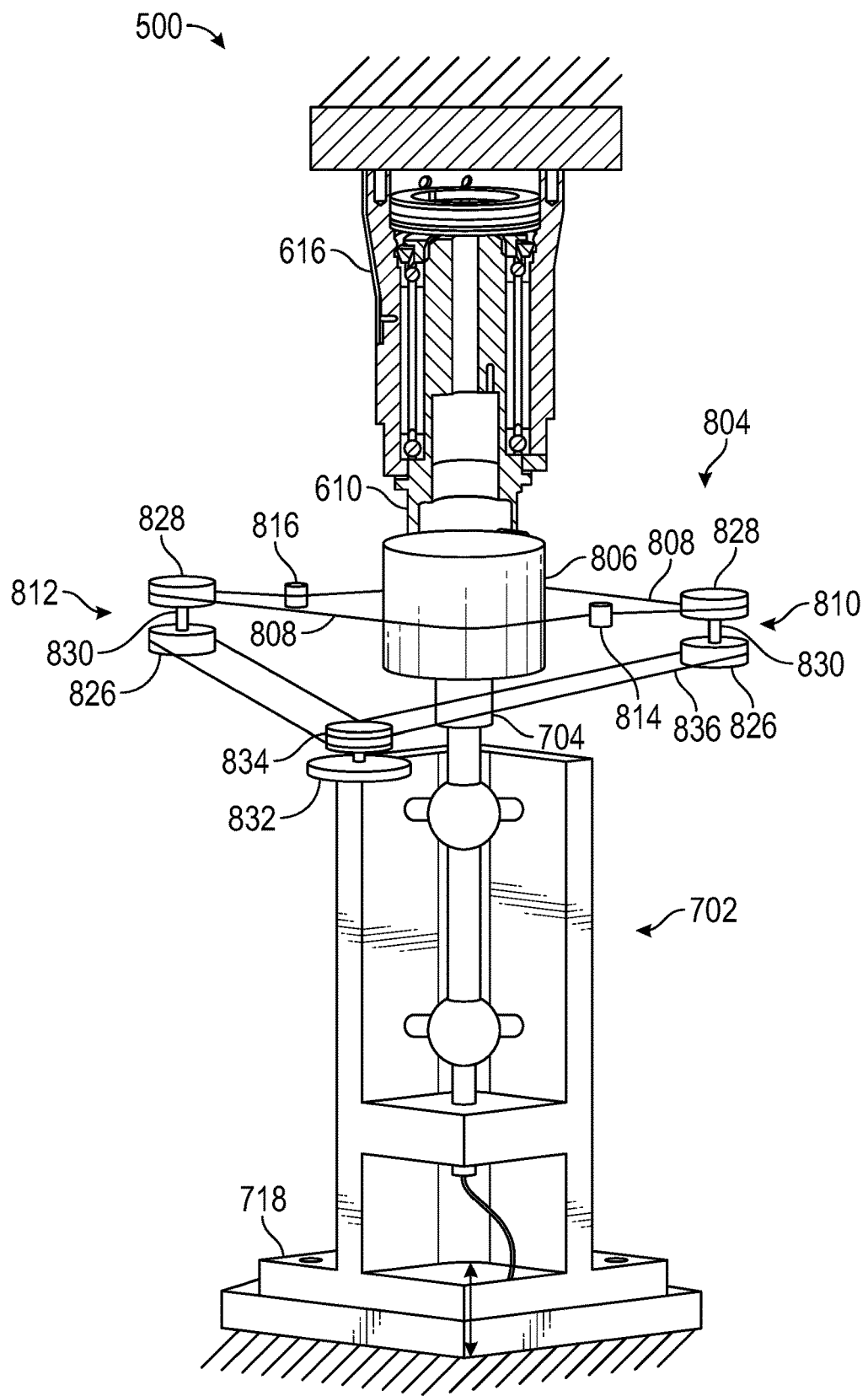
FIG. 13 is a perspective view of an exemplary drive mechanism for use with the bearing runout measurement apparatus of FIG. 10.
Figure 14:
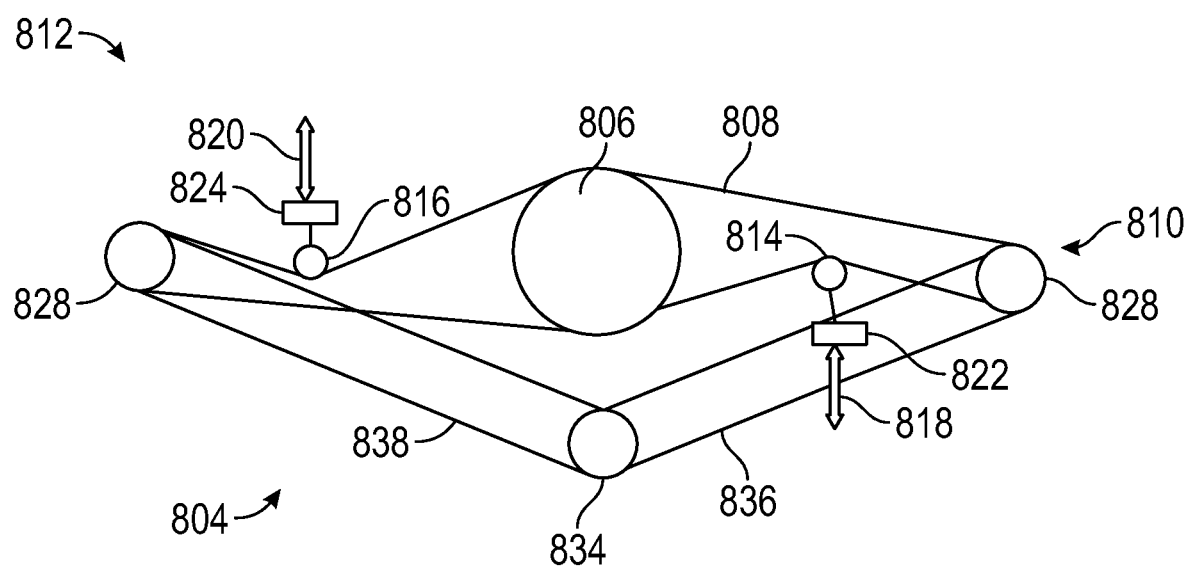
FIG. 14 is a top view of the drive mechanism of FIG. 13.

During the calibration process, the shaft 610 is driven by the drive system 804 as shown in FIGS. 13-14 via transfer element 806. As the shaft 610 is rotated, the first shaft portion 704 of bearing measurement apparatus 700 is rotated. It should be appreciated that the transfer element 806 may be any suitable coupling mechanism or device the securely and rigidly couples the shaft 610 to the first shaft portion 704. In the exemplary embodiment, the drive system 804 includes a first drive belt 808 that extends between a first pulley assembly 810 and a second pulley assembly 812. The first drive belt engages the transfer element 806 and operates to rotate the transfer mechanism via the frictional coupling between the first drive belt 808 and a surface (e.g. the outer surface) of the transfer element 806. In other embodiments, the first drive belt 808 may include teeth that engage teeth on the transfer element 806 and the pulley assemblies 810, 812. A pair of tensioners 814, 816 are positioned intermediate the transfer element 806 and the respective pulley assemblies 810, 812. The tensioners 814, 816 are moved by actuators 818, 820 in response to a signal from force sensors 822, 824. The force sensors monitor the tension on the first drive belt 8080 and provide a desired level of tension via a closed loop feedback to the actuators 818, 820 to prevent or reduce the risk of slippage between the first drive belt 808 and the transfer element 806.

Each of the pulley assemblies 810, 812 includes an input pulley 826 and an output pulley 828. Each output pulley 828 is coupled to the first drive belt 808 as described above. The input pulley 826 is coupled to the output pulley 828 by a shaft 830 such that rotation of either pulley causes a rotation of the other. A motor 832 is provided with a pulley member 834. The pulley member 834 is coupled to the input pulley 826 first pulley assembly 810 via a second drive belt 836. The pulley member 834 is further coupled to the input pulley 826 of the second pulley assembly 812 via a third drive belt 838. In this manner, the motor 832 is operably coupled to rotate the pulley assemblies 810, 812 and therefore the transfer element 806. In the exemplary embodiment, the motor 832 is coupled to the frame 718. As discussed above, the frame 718 and the cartridge housing 616 are rigidly affixed to a fixture (not shown). It should be appreciated that in other embodiments, the motor 832 may be mounted to the fixture (or another frame) separately from the frame 718. It should be appreciated that the use of the drive belts 808, 836, 838 facilitates the isolation of the cartridge 500 from motion errors in the motor 832 and also ensures that a balanced force is applied to the shaft 610, preventing or reducing the risk of a bending moment from being applied to cartridge shaft 610.

Figure 15:
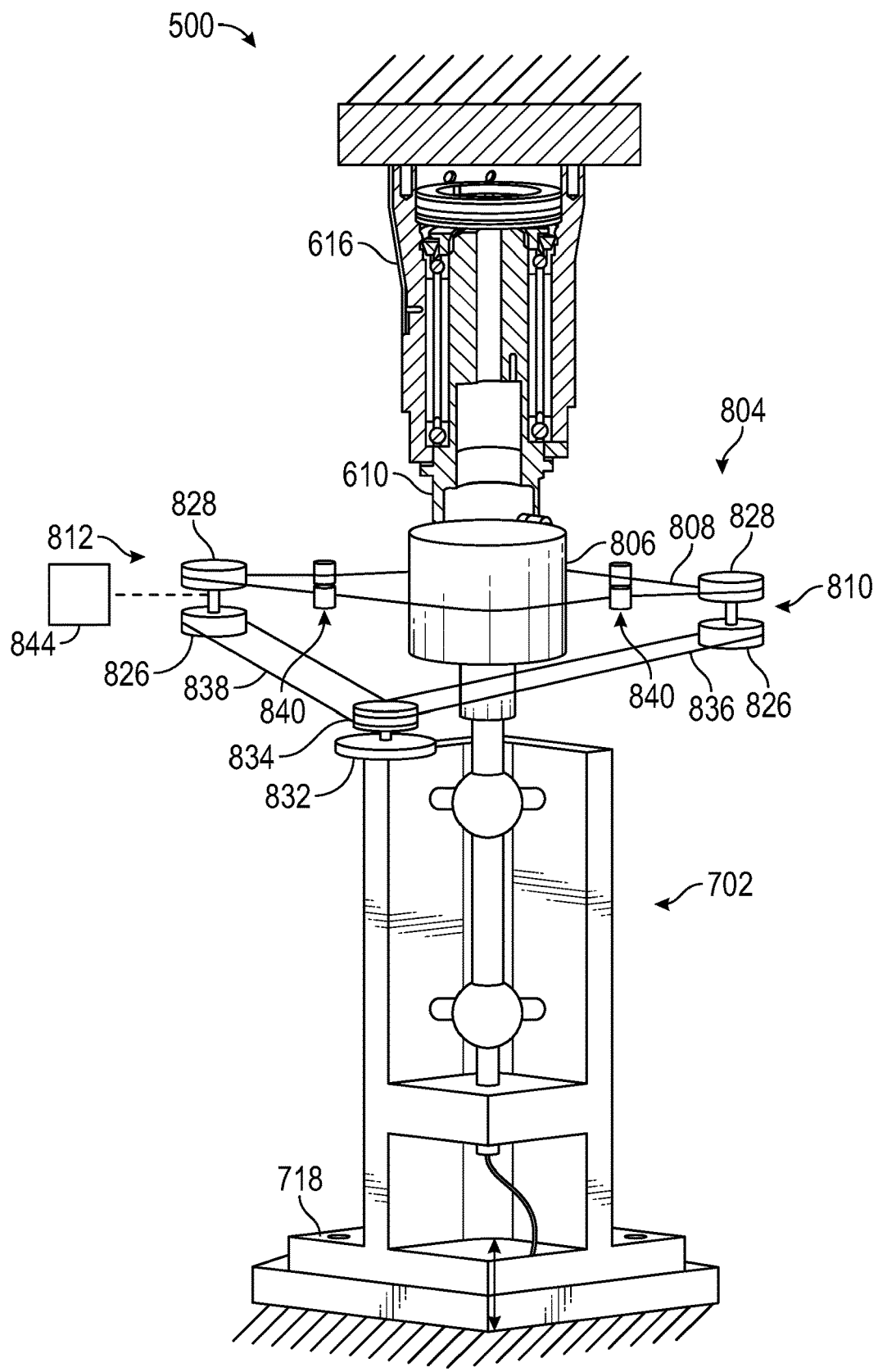
FIG. 15 is a perspective view of another embodiment of a drive mechanism for use with the bearing runout measurement apparatus of FIG. 10.
Figure 16:
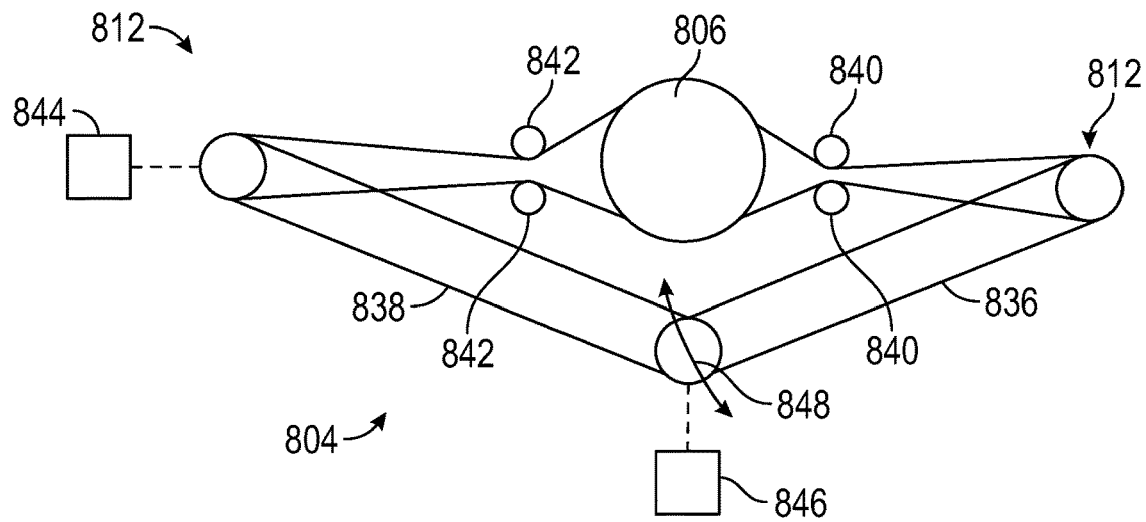
FIG. 16 is a top view of the drive mechanism of FIG. 15.

Referring now to FIGS. 15-16, another embodiment of drive system 804 is shown. This embodiment is similar to that of FIGS. 13-14, with a motor 832 rotating a pulley 834 to drive a pair of drive belts 836, 838 that are coupled to pulley assemblies 810, 812. The rotation of the drive belts 836, 838 in turn moves drive belt 808 that is coupled between the pulley assemblies 810, 812 and the transfer element 806. In this embodiment, the tensioner pulleys 814, 816 are replaced with pairs of idler pulleys 840, 842. To tension the drive belt 808, an actuator or adjustable spring 844 is coupled to move the second pulley assembly 812 toward or away from the transfer element 806. It should be appreciated that movement of the second pulley assembly 812 will in turn reduce or increase the amount of tension on the drive belt 808. A second actuator or adjustable spring 846 moves the motor 832 and pulley 834 along an arcuate path represented by arrow 848 to maintain the desired tension on the drive belts 836, 838. The arcuate path 848 has a center coaxial with pulley assembly 810. As discussed above, the drive belts 808, 836, 838 cooperate to isolate the motion errors from the motor 832 and the arrangement of drive mechanism 804 also ensures a balanced force couple is applied to the transfer element 806, preventing or reducing the risk of a bending moment from being applied to cartridge shaft 610.

Figure 17:
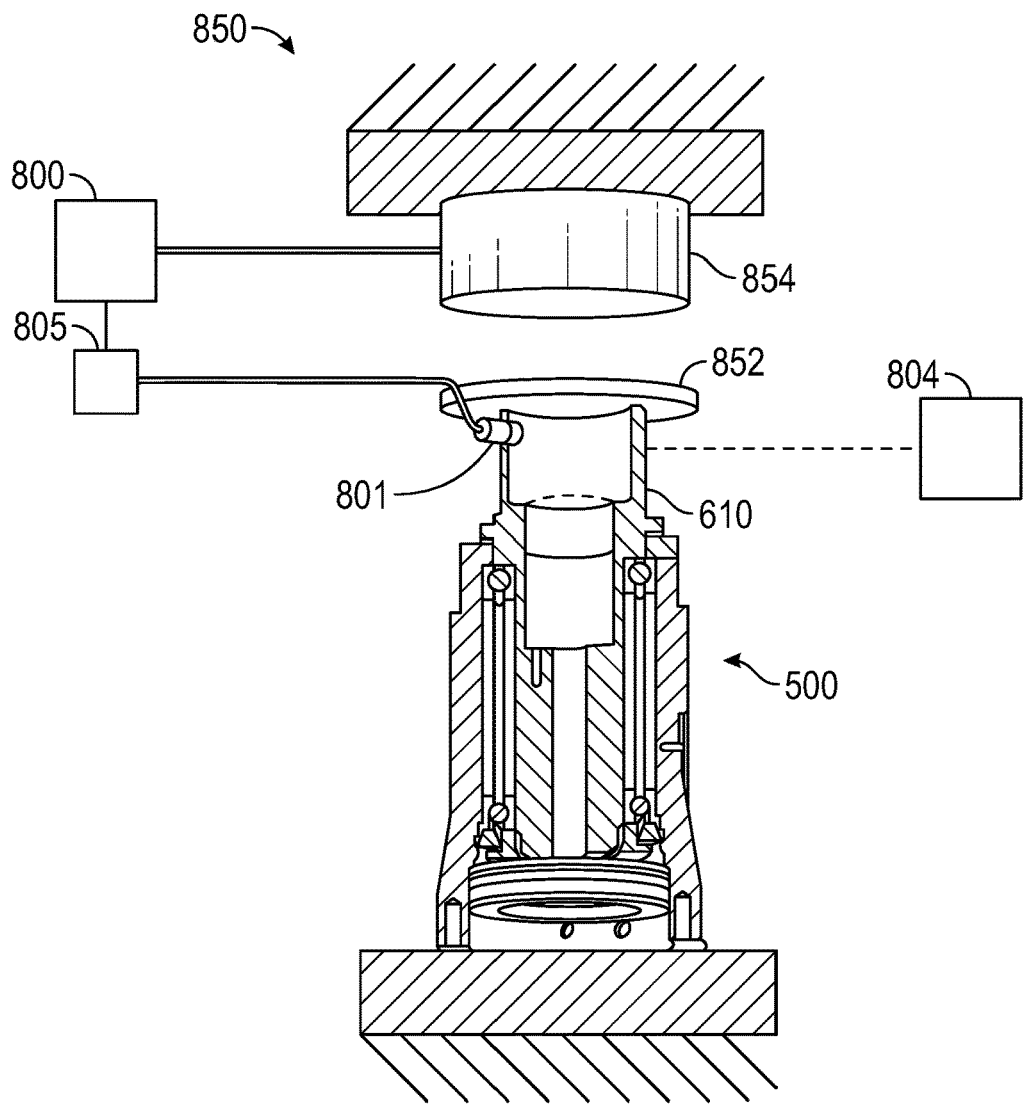
FIG. 17 is perspective view of an encoder/bearing cartridge and a bearing runout measurement apparatus according to another embodiment of the invention.
Figure 18A:
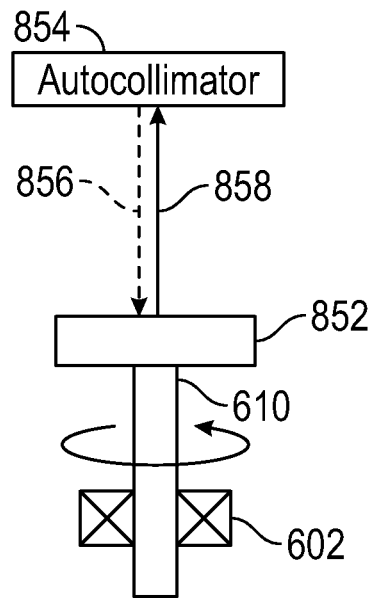
FIG. 18A and FIG. 18B are schematic illustrations of the operation of the apparatus of FIG. 17.
Figure 18B:
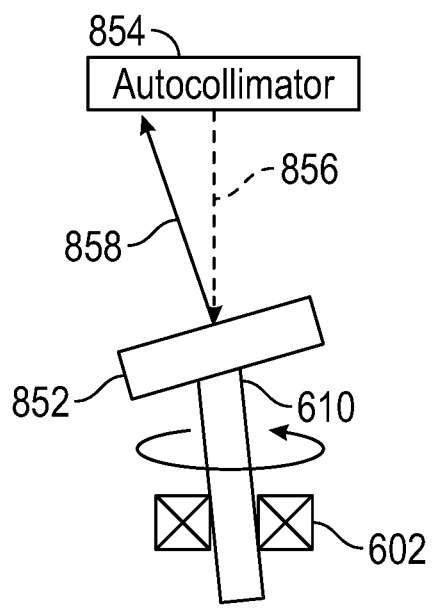

Referring now to FIG. 17, another embodiment of a bearing measurement apparatus 850 is shown. In this embodiment, a reflective surface, such as mirror 852, is mounted to the end of shaft 610. Arranged opposite the mirror 852 is an autocollimator 854. An autocollimator is an optical instrument for non-contact measurement of angles. An autocollimator operates by projecting an image onto a target mirror, and measuring the deflection of the returned image against a scale by means of an electronic detector. As shown in FIG. 18A, if the cartridge 500 has no or very little "wobble", the image 856 from the autocollimator 854 is reflected back along the same or substantially the same path 858. Where the shaft 610 has angular displacement as it is rotated, the image 856 will reflect back along a path 860 as shown in FIG. 18B that is on an angle θ to the image 856. The autocollimator 854 transmits a signal to the electrical or processing circuit 800. As discussed above, the sensor 801 may transmit a signal via a circuit board 805 to the processing circuit 800. From the angle θ and the known distance between the mirror 852 and the autocollimator 854, the displacement (the tilt angle) of the cartridge shaft 610 with respect to the cartridge housing 616 may be determined. During operation, as the shaft 610 is rotated, the processing circuit combines the signals from the autocollimator 854, and optical encoder to generate a map of displacement as a function of rotation over each 360 degree cycle.

It should be appreciated that the calculated displacements from the autocollimator measurements may be associated with the rotational values and the angle of the cartridge shaft. Thus compensation values may be determined for any angle of each rotational value that is measured during the calibration process. These compensation values from each of the bearing cartridges in the AACMM 100 may then be utilized by the electronic data processing system 210 to account for bearing runout errors and improve the accuracy of the three-dimensional coordinates measured by the AACMM 100.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of correcting errors in a bearing cartridge used in a coordinate measurement device, the method comprising:
   providing the cartridge having a first bearing and a second bearing arranged in a predetermined relationship to define an axis, the cartridge further including an angle measurement device that measures an angle of rotation of a portion of the cartridge about the axis and transmits an angle measurement signal in response;
   rotating the portion of the cartridge about the axis by a plurality of turns in a forward direction and in a reverse direction, each turn being 360 degrees;
   measuring for each of the plurality of turns a plurality of first rotational values, each of the plurality of first rotational values comprising a first number of turns of the plurality of turns that the portion of the cartridge is rotated in the forward direction minus a second number of turns of the plurality of turns the portion of the cartridge is rotated in the reverse direction;
   measuring over the plurality of turns a plurality of angles with the angle measurement device;
   determining a first plurality of displacements at a first position along the axis, each of the first plurality of displacements being associated with one of the plurality of angles and one of the plurality of first rotational values;
   determining compensation values based at least in part on the measured plurality of angles, the plurality of first rotational values, and the determined first plurality of displacements; and
   storing the compensation values in a memory of the coordinate measurement device.

2. The method of claim 1, further comprising:
   providing a rotational counter that measures a second rotational value of the cartridge, the second rotational value being a third number of turns the portion of the cartridge is rotated in the forward direction minus a fourth number of turns the portion of the cartridge is rotated in the reverse direction; and
   measuring a three-dimensional coordinate of an object with the coordinate measurement device based at least in part on the angular measurement signal, the stored compensation values, and the second rotational value.

3. The method of claim 1, wherein the determining the first plurality of displacements includes measuring the first plurality of displacements along a first line substantially perpendicular to the axis.

4. The method of claim 3, further comprising measuring a second plurality of displacements at a second position along the axis, each of the second plurality of displacements being associated with one of the plurality of angles, the second displacements being measured along a second line substantially perpendicular to the axis, wherein the first position and the second position are separated by a first distance.

5. The method of claim 4, wherein the step of determining compensation values includes determining the compensation values further based at least in part on the second plurality of displacements and the first distance.

6. The method of claim 5, further comprising:
   providing a test apparatus configured to be removably attached to the cartridge, the test apparatus having a first sensor and a second sensor; and
   attaching the test apparatus to the cartridge so as to arrange the first sensor at the first position and the second sensor at the second position;
   wherein in the step of measuring the plurality of first displacements, the first displacements are measured with the first sensor, and in the step of measuring the plurality of second displacements, the second displacements are measured by the second sensor.

7. The method of claim 1, further comprising:
   providing a reflective surface attached to one end of the cartridge and configured to rotate about the axis with the portion;
   providing an autocollimator;
   emitting a light beam from the autocollimator toward the reflective surface;
   receiving by the autocollimator a reflected beam, the reflected light beam being a portion of the emitted light beam reflected by the reflective surface; and
   determining a plurality of reflection angles for the reflected light beam, wherein each of the plurality of reflection angles is associated with one of the plurality of angles.

8. The method of claim 1, further comprising:
   providing a drive mechanism configured to rotate the portion of the cartridge about an axis; and;
   coupling the drive mechanism to the cartridge;
   wherein the step of producing the rotation over a plurality of turns, the rotation is produced by the drive mechanism.

9. The method of claim 8, wherein:
   in the step of providing the drive mechanism, the drive mechanism includes a motor and a first belt member; and
   further comprising a step of operably coupling the motor and the cartridge by the first belt member.

10. The method of claim 9, wherein in the step of providing the drive mechanism, the drive mechanism further includes a second belt member coupled to the first belt member by a first pulley assembly.

11. A coordinate measurement device comprising:
    a cartridge;

a first bearing coupled to the cartridge;

a second bearing arranged in a predetermined relationship with the first bearing to define an axis;

an angle measurement device that is operable to measure an angle of rotation of a portion of the cartridge about the axis and transmits an angle measurement signal in response;

a rotational counter that is operable to measure a second rotational value of the cartridge, the second rotational value being a third number of turns the portion of the cartridge is rotated in the forward direction minus a fourth number of turns the portion of the cartridge is rotated in the reverse direction;

a processor that is responsive to executable instructions when executed on the processor for measuring for each of a plurality of turns of the cartridge a plurality of first rotational values, each of the plurality of first rotational values comprising a first number of turns of the plurality of turns that the portion of the cartridge is rotated in the forward direction minus a second number of turns of the plurality of turns the portion of the cartridge is rotated in the reverse direction;

wherein the processor is further responsive for determining a first plurality of displacements at a first position along the axis, each of the first plurality of displacements being associated with one of the plurality of angles and one of the plurality of first rotational values; and wherein the processor is further responsive to determine compensation values based at least in part on the measured plurality of angles, the plurality of first rotational values, and the determined first plurality of displacements.

12. The device of claim 11, wherein the processor is further responsive to measuring a three-dimensional coordinate of an object based at least in part on the angular measurement signal, the stored compensation values, and the second rotational value.

13. The device of claim 12, wherein the processor is further responsive to measure a second plurality of displacements at a second position along the axis, each of the second plurality of displacements being associated with one of the plurality of angles, the second displacements being measured along a second line substantially perpendicular to the axis, wherein the first position and the second position are separated by a first distance.

14. The device of claim 13, wherein the determining compensation values includes the processor determining the compensation values further based at least in part on the second plurality of displacements and the first distance.

15. The device of claim 11, further comprising:
a test apparatus removably attached to the cartridge, the test apparatus having a first sensor and a second sensor; and
wherein in the measuring of the plurality of first displacements, the first displacements are measured with the first sensor, and in the measuring the plurality of second displacements, the second displacements are measured by the second sensor.

16. The device of claim 11, further comprising:
an autocollimator;
a reflective surface attached to one end of the cartridge and configured to rotate about the axis with the portion;
wherein the processor is further responsive to determining a plurality of reflection angles in response of light beam emitted by the autocollimator and reflected off of the reflective surface, wherein each of the plurality of reflection angles is associated with one of the plurality of angles.

17. The device of claim 11, further comprising:
a drive mechanism coupled to the cartridge and configured to rotate the portion of the cartridge about an axis;
wherein the producing the rotation over a plurality of turns, the rotation is produced by the drive mechanism.

18. The device of claim 17, wherein the drive mechanism further comprises:
a first belt member; and
a motor coupled to the cartridge by the first belt member.

19. The device of claim 18, the drive mechanism further comprises a second belt member coupled to the first belt member by a first pulley assembly.

* * * * *